United States Patent
Kang et al.

(10) Patent No.: US 10,088,901 B2
(45) Date of Patent: Oct. 2, 2018

(54) DISPLAY DEVICE AND OPERATING METHOD THEREOF

(71) Applicant: LG ELECTRONICS INC., Seoul (KR)

(72) Inventors: Sangkyu Kang, Seoul (KR); Sewon Park, Seoul (KR); Wooseok Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 670 days.

(21) Appl. No.: 14/477,657

(22) Filed: Sep. 4, 2014

(65) Prior Publication Data

US 2015/0331598 A1    Nov. 19, 2015

(30) Foreign Application Priority Data

May 16, 2014   (KR) .................. 10-2014-0058777

(51) Int. Cl.
   *G06F 3/048*    (2013.01)
   *G06F 3/01*     (2006.01)

(52) U.S. Cl.
   CPC .............. *G06F 3/014* (2013.01); *G06F 3/011* (2013.01)

(58) Field of Classification Search
   CPC ..... G06F 3/014; G06F 3/011; A63B 24/0062; A63B 71/0622; A63B 2071/065; A63B 2024/0068
   See application file for complete search history.

(56) References Cited

U.S. PATENT DOCUMENTS

| | | | | |
|---|---|---|---|---|
| 5,803,870 A | * | 9/1998 | Buhler | A63B 22/02 482/1 |
| 8,947,382 B2 | * | 2/2015 | Winkler | H04M 1/0233 345/156 |
| 2003/0134714 A1 | * | 7/2003 | Oishi | A63B 24/00 482/6 |
| 2005/0215870 A1 | * | 9/2005 | Rademaker | A61B 5/00 600/301 |
| 2006/0084551 A1 | * | 4/2006 | Volpe, Jr. | A63B 71/0686 482/8 |
| 2007/0033069 A1 | * | 2/2007 | Rao | A63B 24/00 705/2 |
| 2011/0224564 A1 | * | 9/2011 | Moon | A61B 5/00 600/509 |
| 2013/0222271 A1 | * | 8/2013 | Alberth | G06F 1/163 345/173 |

FOREIGN PATENT DOCUMENTS

WO    WO 2006053349 A1 *  5/2006  ......... A63B 24/0084

* cited by examiner

*Primary Examiner* — Sara England
(74) *Attorney, Agent, or Firm* — Birch, Stewart, Kolasch & Birch, LLP

(57) ABSTRACT

Provided is an operating method of a display device. The method includes: recognizing a wearable device; and providing a user interface screen of the display device differently on the basis of a wearing state of the wearable device representing whether a user wears the recognized wearable device.

16 Claims, 25 Drawing Sheets

<WEARABLE DEVICE NOT WORN>

<WEARABLE DEVICE IS WORN>

<running>    or    <walking>

<stop>

DISPLAY DEVICE AND OPERATING METHOD THEREOF

CROSS-REFERENCE TO RELATED APPLICATIONS

This application claims the benefit of Korean Patent Application No. 10-2014-0058777, filed on May 16, 2014 entitled "DISPLAY DEVICE AND OPERATING METHOD THEREOF", which is hereby incorporated by reference in its entirety into this application.

BACKGROUND

The present disclosure relates to a display device and an operating method thereof.

Recently, a wearable device receives attention as the next generation smart device. As a high performance smartphone market enters a mature stage, the wearable device began to attract attention as a new source of revenue.

The wearable device, as a device detachable from a portion of a person's body, includes information on a person's body, information on exercises of a person taking exercise, and functions obtained by reducing the functions of other smartphones.

Especially, the wearable device may be applied to a product that a user wears usually, for example, a watch, a band, and a glasses, and may exchange information in linkage with a smartphone and a TV.

However, a terminal such as a typical wearable device, a smartphone, and a TV may not vary a user interface screen provided in consideration of whether a user wears a wearable device and a user's exercise state.

SUMMARY

Embodiments provide an interface screen optimized for a user on the basis of a wearing state of a user's wearable device and a user's exercise state.

Embodiments also provide a display device and an operating method thereof for easily controlling a function of a display device or a function of a wearable device on the basis of a user's hand gesture.

In one embodiment, provided is an operating method of a display device. The method includes: recognizing a wearable device; and providing a user interface screen of the display device differently on the basis of a wearing state of the wearable device representing whether a user wears the recognized wearable device.

In another embodiment, a display device includes: a display unit; a communication unit performing a communication with a wearable device; and a control unit recognizing a wearable device and controlling the display unit thereby providing a user interface screen of the display device differently on the basis of a wearing state of the wearable device representing whether a user wears the recognized wearable device.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments of the present invention will be described in more detail with reference to the accompanying drawings. The suffixes "module" and "unit" for components used in the description below are assigned or mixed in consideration of easiness in writing the specification and, do not have distinctive meanings or roles by themselves.

Figure 1:
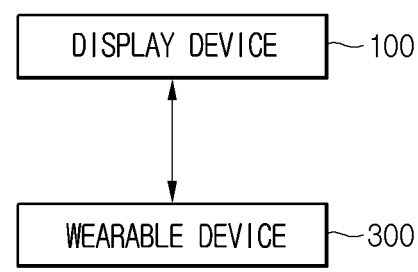
FIG. 1 is a view illustrating a configuration of a health interlocking system according to an embodiment of the present invention.

FIG. 1 is a view illustrating a configuration of a health interlocking system according to an embodiment of the present invention.

The health interlocking system includes a display device 100 and a wearable device 300.

The display device 100 and the wearable device 300 may transmit/receive information through wired communication or wireless communication.

The display device 100 may recognize the presence of the wearable device 300 disposed therearound and may interwork with the recognized wearable device 300.

The display device 100 may be provided at exercise equipment. That is, the display device 100 is provided at exercise equipment, so that it may be disposed in a form for allowing a user to watch media content while the user exercises. Herein, the exercise equipment may be one of treadmills and fitness bikes.

The display device 100 according to an embodiment of the present invention, for example, as an artificial display device adding a computer supporting function to a broadcast receiving function, may have an easy-to-use interface such as a handwriting type input device, a touch screen, or a spatial remote controller. Moreover, with the support of a wired or wireless internet function, the image display may perform a function such as e-mail, web browsing, internet banking, or online game by accessing internet or computers. A standardized general-purpose OS may be used for such various functions.

Accordingly, since various applications are added or deleted freely on a general-purpose OS kernel, the display device 100 described in the present invention may perform user-friendly various functions. In more detail, the display device 100, for example, may be a network TV, an HBBTV, a smart TV, an LED TV, or an OLED TV, and if necessary, may be applied to a smartphone.

The wearable device 800, as a device detachable from a user's body, may be a device for obtaining information on a user's body or exercise information for exercise when a user exercises. The wearable device 300 may have a witch or band form detachable from a wrist or an ankle but is not limited thereto and may have any form as long as the wearable device 300 is detachable from a portion of a user's body, for example, a headset and an earphone wearable on the head of a user.

Figure 2:
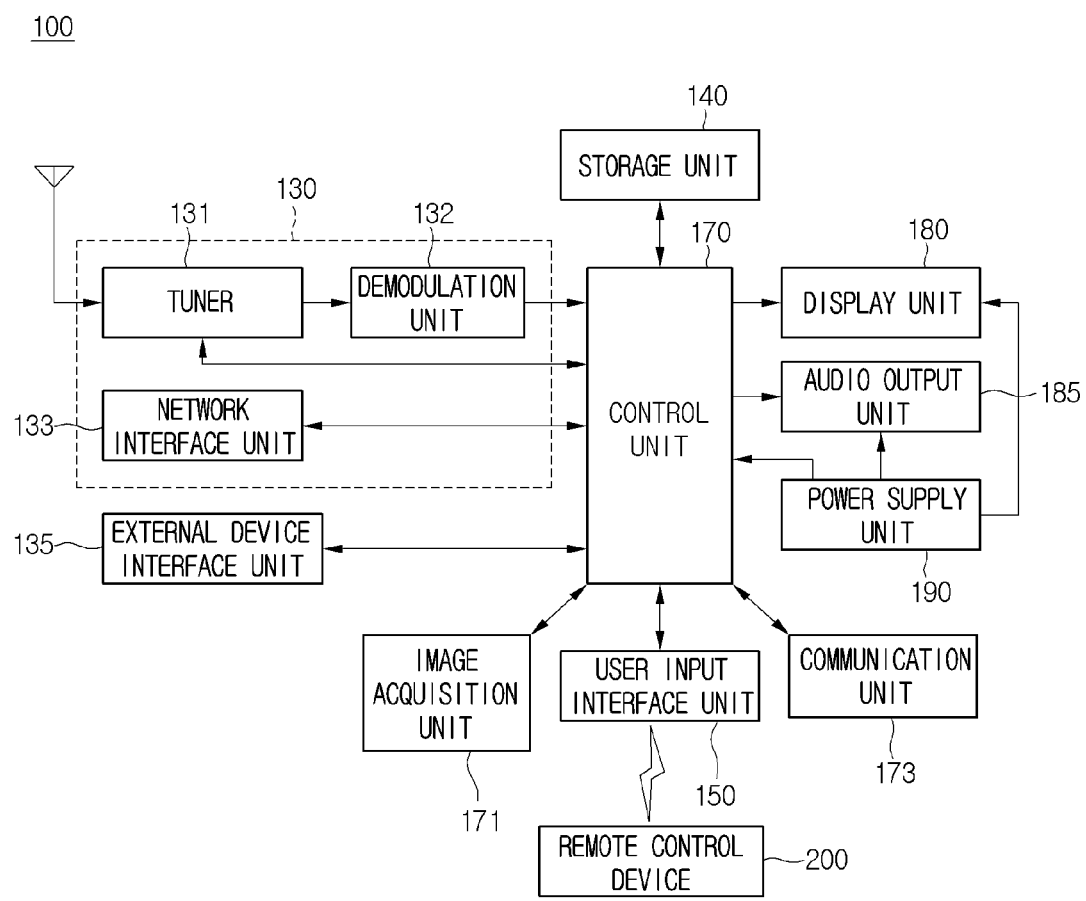
FIG. 2 is a block diagram illustrating a configuration of a display device according to an embodiment of the present invention.

FIG. 2 is a block diagram illustrating a configuration of a display device according to an embodiment of the present invention.

Referring to FIG. 2, the display device 100 may include a broadcast reception unit 130, an external device interface unit 135, a storage unit 140, a user input interface unit 150, a control unit 170, an image acquisition unit 171, display unit 180, an audio output unit 185, and a power supply unit 190. Moreover, the broadcast reception unit 130 may include a tuner 131, a demodulation unit 132, and a network interface 133.

The external device interface unit 135 may receive an application or an application list in an adjacent external device and may then deliver it to the control unit 170 or the storage unit 140.

The network interface unit 133 may provide an interface to connect the display device 100 to a wired/wireless network including an Internet network. The network interface unit 133 may transmit ore receive data to or from another user or another electronic device via an accessed network or another network linked to an accessed network.

Moreover, the network interface unit 133 may transmit part of contents data stored in the display device 100 to a selected user or a selected electronic device among pre-registered other users or other electronic devices.

The network interface unit 133 may access a predetermined webpage via an accessed network or another network linked to an accessed network. That is, the network interface unit 1300 may transmit or receive data to or from a corresponding server by accessing a predetermined webpage via a network.

Then, the network interface unit 133 may receive contents or data provided from a contents provider or a network operator. That is, the network interface unit 133 may receive contents such as movies, advertisements, games, VOD, and broadcast signals provided from a contents provider or a network provider via a network and information relating thereto.

Additionally, the network interface unit 133 may receive update information and update files of firmware provided from a network operator and may transmit data to an internet or contents provider or a network operator.

The network interface unit 133 may select and receive a desired application among applications open to the public via a network.

The storage unit 140 may store a program for each signal processing and control in the control unit 170 and may store signal processed images, voices, or data signals.

Additionally, the storage unit 140 may perform a function for temporarily storing images, voices or data signals inputted from the external device interface unit 135 or the network interface unit 133, and may store information on a predetermined image through a channel memory function.

The storage unit 140 may store an application or an application list inputted from the external device interface unit 135 or the network interface unit 133.

The display device 100 may play a contents file (for example, a video file, a still image file, a music file, a document file, and an application file) stored in the storage unit 140 and may then provide it to a user.

The user input interface unit 150 may deliver a signal that a user inputs to the control unit 170 or may deliver a signal from the control unit 170 to a user. For example, the user input interface unit 150 may receive and process a control signal for power on/off, channel selection, and screen setting from a remote control device 200 or may transmit a control signal from the control unit 170 to the remote control device 200 according to various communication methods such as Bluetooth, Ultra Wideband (WB), ZigBee, Radio Frequency (RF) and IR communication methods.

Additionally, the user input interface unit 150 may deliver a control signal inputted from a local key (no shown) such as a power key, a channel key, a volume key, and a setting key to the control unit 170.

An image signal image-processed in the control unit 170 may be inputted to the display unit 180 and may then be displayed as an image corresponding to a corresponding image signal. Additionally, an image signal image-processed in the control unit 170 may be inputted to an external output device through the external device interface unit 135.

A voice signal processed in the control unit 170 may be outputted to the audio output unit 185. Additionally, a voice signal processed in the control unit 170 may be inputted to an external output device through the external device interface unit 135.

Besides that, the control unit 170 may control overall operations in the display device 100.

Moreover, the control unit 170 may control the display device 100 through a user command inputted through the user input interface unit 150 or an internal program, or may download an application or an application list that a user wants into the image display device 100 by accessing a network.

The control unit 170 may allow both information on a channel that a user selects and processed image or voice to be outputted through the display unit 180 or the audio output unit 185.

Moreover, the control unit 170 may allow image signals or voice signals inputted from an external device connected through the external device interface unit 135, for example, a camera or a camcorder, to be outputted through the display unit 180 or the audio output unit 185 in response to an external device image playback command received through the user input interface unit 150.

Moreover, the control unit 170 may perform a control on the display unit 180 to display an image and for example, may perform a control to display on the display unit 180 a broadcast image inputted through the tuner 131, an external input image inputted through the external device interface unit 135, an image inputted through the network interface unit 133, or an image stored in the storage unit 140. In this case, an image displayed on the display unit 180 may be a still image or a video, or may be a 2D image or a 3D image.

Additionally, the control unit 170 may perform a control to play contents stored in the display device 100, received broadcast contents, or external input contents inputted from the outside, and the contents may be in various forms, for example, a broadcast image, an external input image, an audio file, a still image, an accessed web screen, and a document file.

The display unit 180 may convert an image signal processed in the control unit 170, a data signal, an OSD signal, an image signal received from the external device interface unit 135, or a data signal into R, G, and B signals so as to generate a driving signal.

Moreover, the display device 100 shown in FIG. 2 is just one embodiment, and thus some of the components shown in FIG. 1 may be integrated, added, or omitted according to the specification of the actually implemented display device 100.

That is, at least two components may be integrated into one component or one component may be divided into more than two components, if necessary. Additionally, a function performed in each block is used to describe an embodiment of the present invention and its specific operation or device does not limit the scope of the present invention.

According to another embodiment of the present invention, unlike those shown in FIG. 2, the display device 100 may not include the tuner 131 and the demodulation unit 132 and may receive an image through the network interface unit 133 or the external device interface unit 1235 and may then play it.

For example, the display device 100 may be divided into an image processing device such a settop box for receiving broadcast signals or contents according to various networks and a contents playback device playing contents inputted from the image processing device.

In this case, an operating method of a display device described below according to an embodiment of the present invention may be performed by one of the image processing device such as a separated settop box or the contents playback device including the display unit 180 and the audio output unit 185 in addition to the display device 100 described with reference to FIG. 2.

Figure 3:
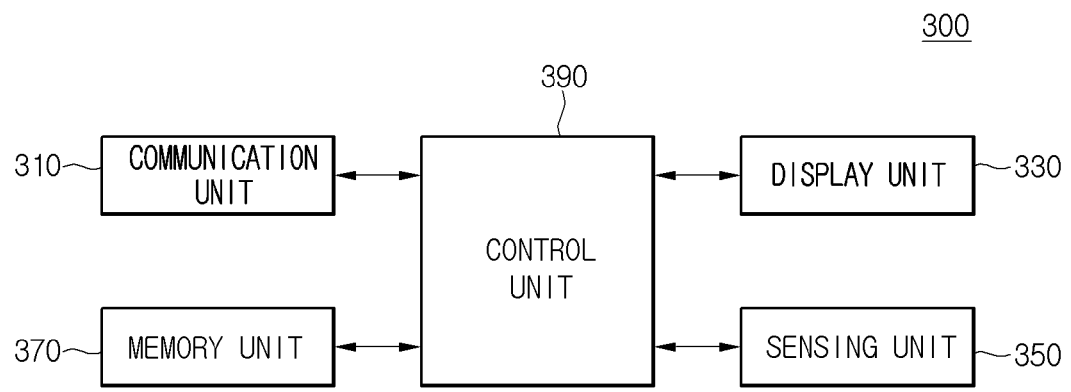
FIG. 3 is a block diagram of a wearable device according to an embodiment of the present invention.

FIG. 3 is a block diagram of a wearable device according to an embodiment of the present invention.

Referring to FIG. 3, the wearable device 300 includes a communication unit 310, a display unit 330, a sensing unit 350, a memory unit 370, and a control unit 390.

The communication unit 310 may exchange information with the communication unit 173 of the display device 100 through wired communication or wireless communication. Especially, the communication unit 310 may obtain user's body information and exercise information and may then transmit it to the communication unit 173 of the display device 100.

The user's body information may include information on a user's body portion, for example, a user's heart rate, a user's temperature, and a user's blood pressure.

The user's exercise information may include a user's pulse rate, exercise distance, exercise time, number of steps, and target amount, and achievement amount.

The communication unit 310 may receive a control command from the communication unit 173 of the display device 100. This will be described in more detail later.

The display unit 330 may display image signals and audio signals processed in the control unit 390.

The sensing unit 350 may detect a user's body condition. The sensing unit 350 may detect a user's heart rate, a user's temperature, and a user's blood pressure. For this, the sensing unit 350 may include a heart rate sensor, a temperature sensor, and a blood pressure measurement sensor.

The sensing unit 350 may detect a user's exercise state. The sensing unit 350 may include an acceleration sensor or a vibration sensor to check a user's exercise state.

The memory unit 370 may store a program for controlling a signal processed by the control unit 390 and signal processing. Additionally, the memory unit 370 may store signal-processed image, voice, or data signals.

The control unit 390 may control overall operations of the wearable device 300. The control unit 390 may transmit user's exercise information to the display device 100 through the communication unit 310.

The control unit 390 may receive a control command from the display device 100 and may then control a function of the wearable device 300 corresponding to the control command.

Then, referring to FIG. 4, an operating method of the display device 100 according to an embodiment of the present invention will be described.

Hereinafter, an operating method of a display device according to an embodiment of the present invention is described in conjunction with the contents of FIGS. 1 to 3.

Figure 4:
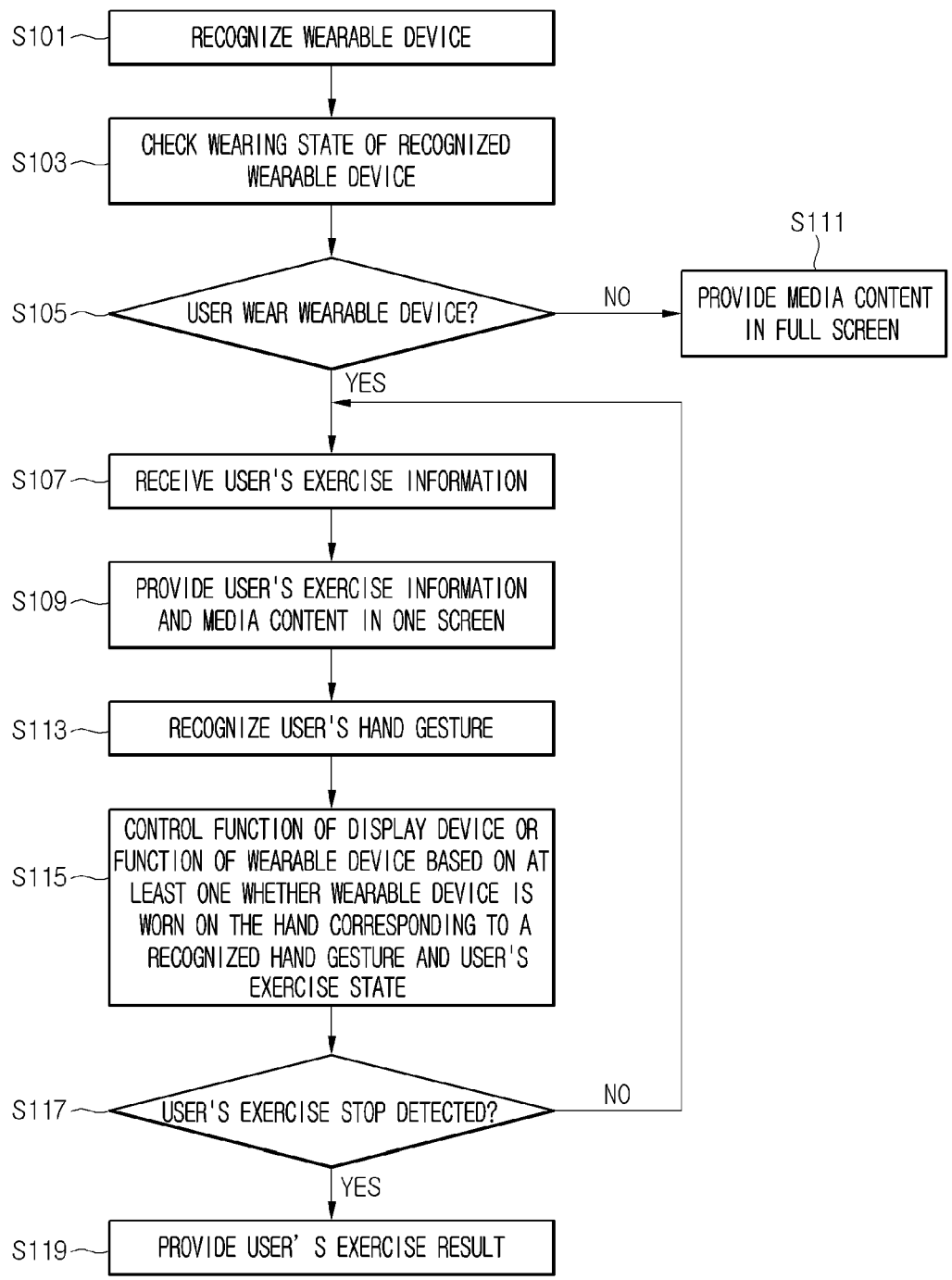
FIG. 4 is a flowchart illustrating an operating method of a display device according to an embodiment of the present invention.

FIG. 4 is a flowchart illustrating an operating method of a display device according to an embodiment of the present invention.

The control unit 170 recognizes the wearable device 300 disposed around the display device 100 in operation S101.

According to an embodiment of the present invention, the control unit 170 may recognize the presence of the wearable device 300 disposed within a predetermined distance range to the display device 100. For this, the display device 100 and the wearable device 300 may perform short range wireless communication. Herein the short range wireless communication may use at least one standard of Bluetooth, Wi-Fi, Near Field communication (NFC), and Zigbee. Especially, when performing communication through NFC standard, a user wearing the wearable device 300 may be tagged on an NFC reader mounted on the display device 100 through an NFC tag mounted on the wearable device 300. The control unit 170 of the display device 100 may recognize the wearable device 300 by receiving information on the wearable device 300 through the NFC reader included in the communication unit 173.

The display device 100 may receive information only the wearable device 300 through NFC tagging. The information on the wearable device 300 may include identification information of the wearable device 300 and user's exercise information that the wearable device 300 collects.

The identification information of the wearable device 300 may be information for identifying the wearable device 300.

The user's exercise information that the wearable device 300 collects is described later but may include a user's pulse rate, exercise distance, exercise time, number of steps, and target amount, and achievement amount.

According to another embodiment of the present invention, the control unit 170 may recognize the wearable device 300 by using a user's image obtained through the image acquisition unit 171. In more detail, the image acquisition unit 171 may obtain a user's image positioned at the front of the display device 100. The control unit 170 may recognize the presence of the wearable device 300 by checking whether a user wears the wearable device 300 through a user's captured image. For this, the storage unit 140 may store an image for the wearable device 300 and the control unit 170 may compare a stored image for the wearable device 300 and an image of the wearable device 300 extracted through capturing and may then recognize the wearable device 300 according to a comparison result.

The control unit 170 may check a wearing state of the recognized wearable device 300 in operation S103.

The control unit 170 may check whether a user wears the recognized wearable device 300.

According to an embodiment of the present invention, the control unit 170 may check a wearing state of the recognized wearable device 300 by obtaining a user's image. That is, the control unit 170 may check whether a user wears the wearable device 300 by extracting an image for the wearable device 300 from the user's obtained image. A camera included in the image acquisition unit 171 may capture a user's image and the control unit 170 may extract an image of the wearable device 300 worn at a user's specific body portion from the user's captured image to check whether a user wears the wearable device 300.

According to another embodiment of the present invention, the control unit 170 may determine a wearing state of the wearable device 300 by receiving user's body information from the recognized wearable device 300. That is, the display device 100 may receive user's body information detected through various kinds of sensors equipped at the wearable device 300 and may check a wearing state of the wearable device 300 by using the received user's body information. Here, the user's body information may include information on a user's body portion, for example, a user's heart rate, a user's temperature, and a user's blood pressure.

When information on a user's pulse rate is received in real time, it is confirmed that a user wears the wearable device 300.

When it is confirmed that the user wears the wearable device 300 in operation S105, the control unit 170 receives user's exercise information from the wearable device 300 in operation S107.

According to an embodiment of the present invention, the user's exercise information may include a user's pulse rate, exercise distance, exercise time, number of steps, target exercise amount, and achievement exercise amount but is not limited thereto, and may further include a variety of information according to types of the wearable device 300 or types of exercise.

The control unit 170 provides user's received exercise information and media content being displayed to one screen in operation S109.

If it is confirmed that the user does not wear the wearable device 300 in operation S105, the control unit 170 provides media content being displayed to an entire screen in operation S111.

According to an embodiment of the present invention, the control unit 170 may differently provide a user interface screen on the basis of a wearing state of the wearable device 300. When it is confirmed that a user wears the wearable device 300, the control unit 170 may provide exercise information received from the wearable device 300 and media content being played to one screen simultaneously.

If it is confirmed that the user does not wear the wearable device 300, the control unit 170 provides media content to an entire screen of the display unit 180.

According to another embodiment of the present invention, the control unit 170 may differently provide a user interface screen on the basis of a wearing state of the wearable device 300 and a user's exercise state. When the user wears the wearable device 300 and a user's exercise amount is greater than a reference exercise amount, the control unit 170 may display a playback screen of media content to be larger than a screen displaying user's exercise information. When the user wears the wearable device 300 and a user's exercise amount is less than a reference exercise amount, the control unit 170 may display a playback screen of media content to be smaller than a screen displaying user's exercise information. Herein, the reference exercise amount may be a threshold value that is a reference for differently providing a user interface screen displayed through the display unit 180. In more detail, the reference exercise amount may be a threshold value necessary for changing the size of a user interface screen displayed through the display unit 180. For example, the reference exercise amount may be one of the predetermined number of user's movements per second or a predetermined movement amount of a user per second. When the number of user's movements per 0.5 second is two, the display device 100 may check that a user's exercise amount is greater than a reference exercise amount. The wearable device 300 may check the number of user's movements per second and may transmit information on this to the display device 100. For this, the wearable device 300 may include a sensor detecting a user's movement, for example, an acceleration sensor and a vibration sensor.

The reference exercise amount may set differently according to a user.

Operation S103 to operation S111 will be described in more detail with reference to FIGS. 5 to 10.

Figure 5:
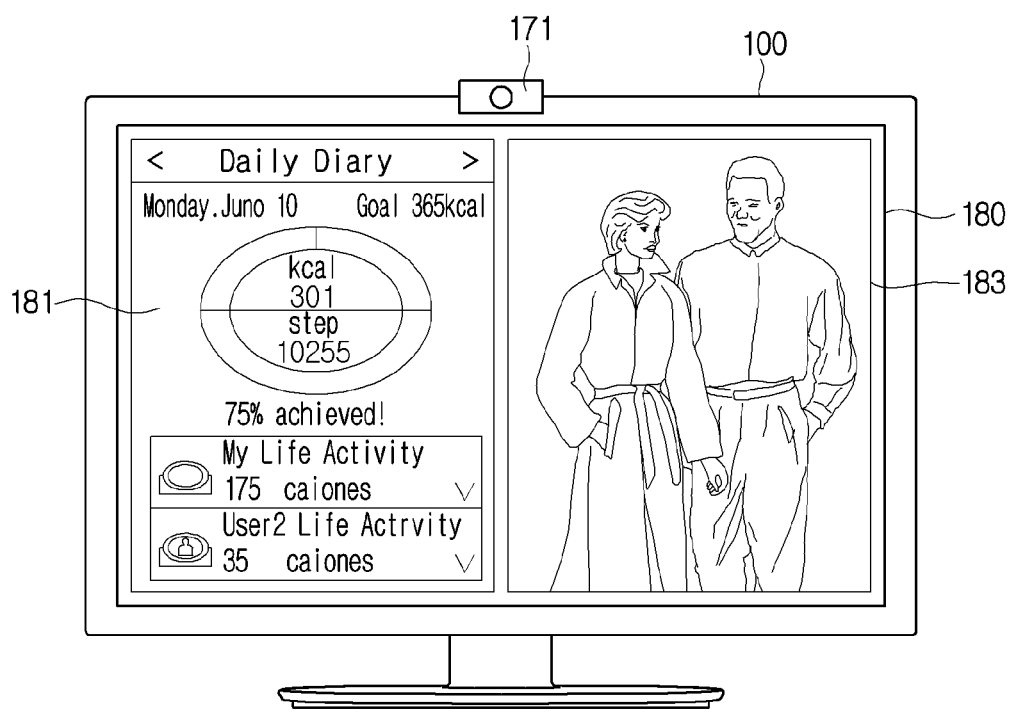
FIGS. 5 to 7 are views illustrating an interface screen provided to a user on the basis of a wearing state of a wearable device according to an embodiment of the present invention.
Figure 5:
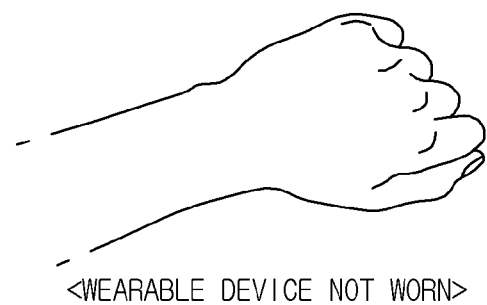
Figure 6:
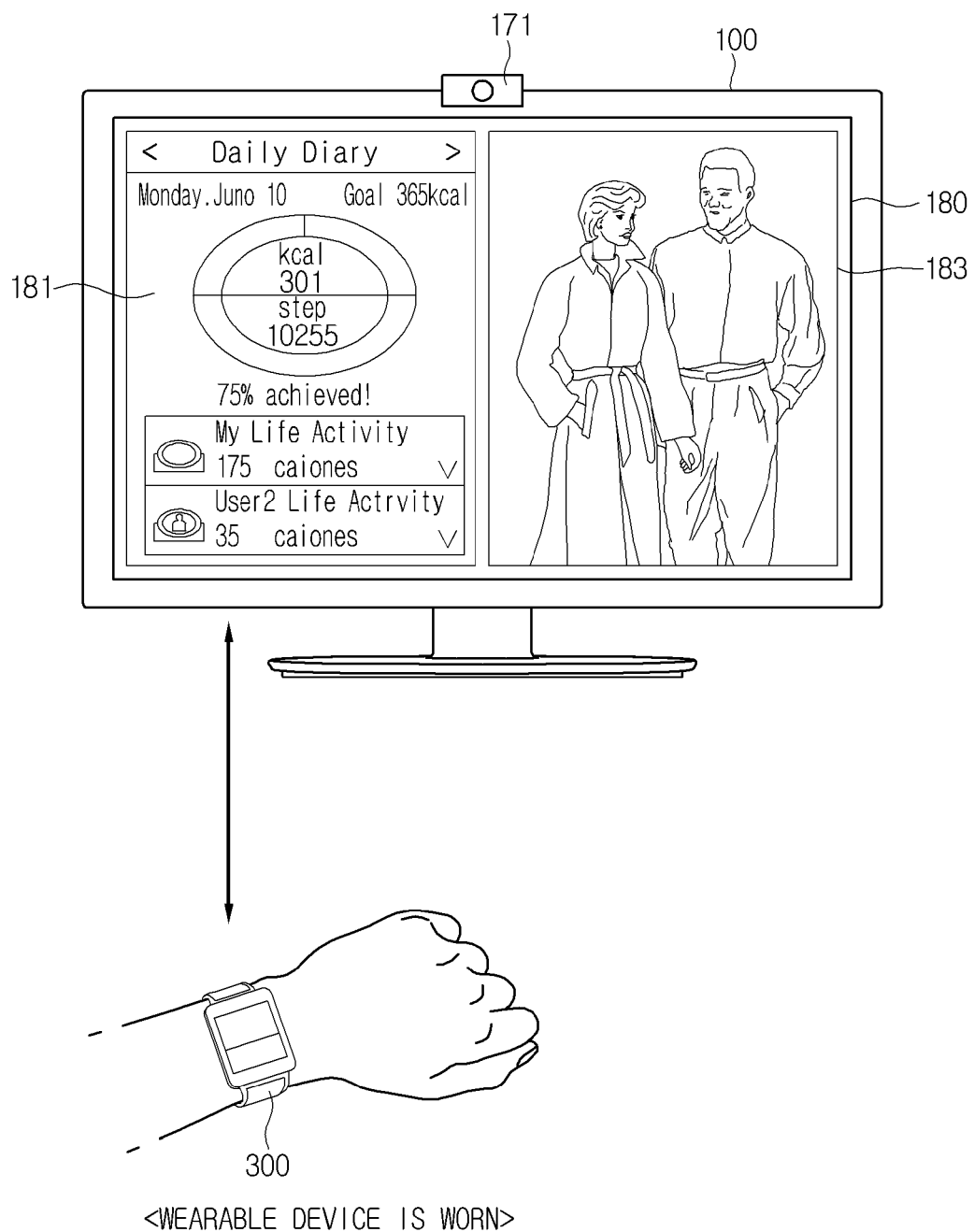
Figure 7:
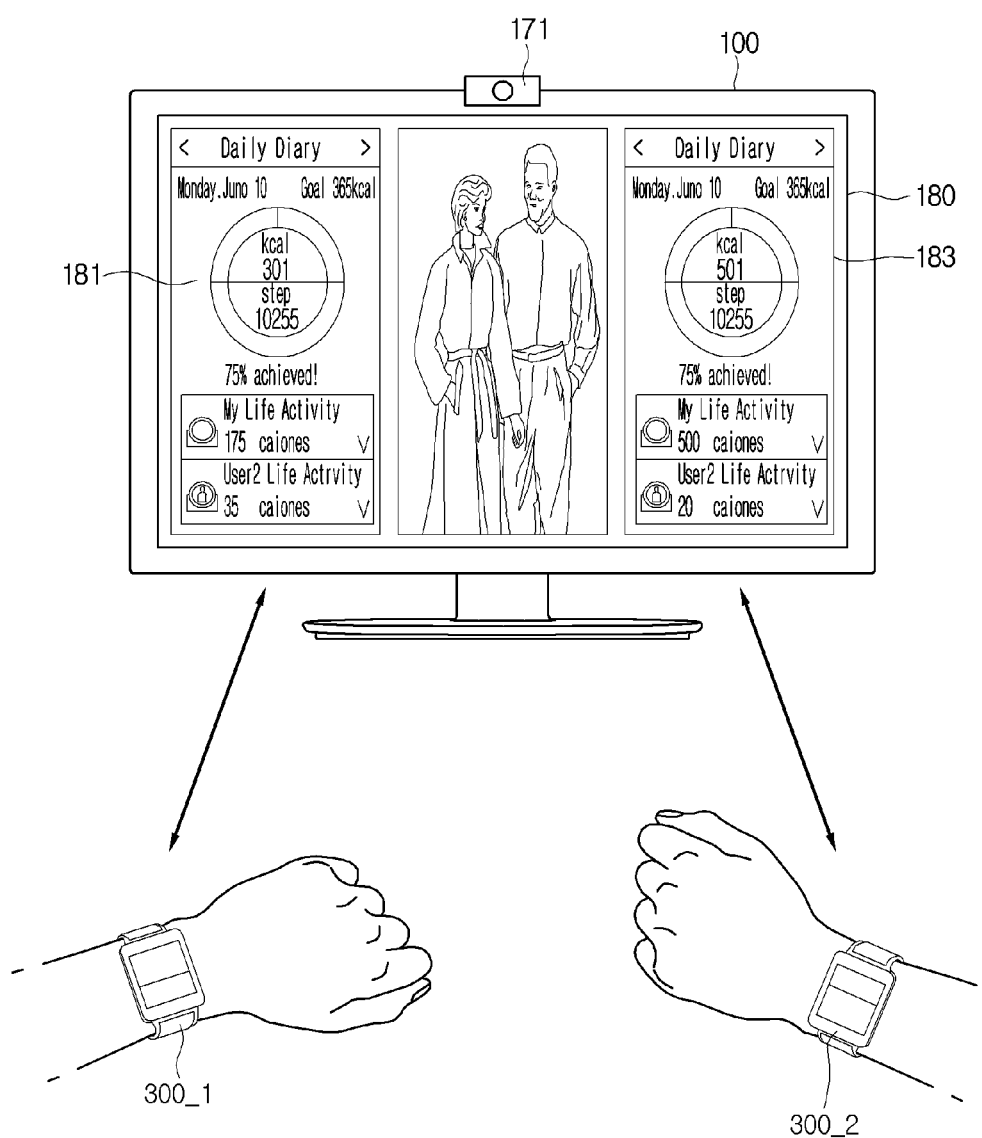

First, FIGS. 5 to 7 are views illustrating an interface screen provided to a user on the basis of a wearing state of a wearable device according to an embodiment of the present invention.

Hereinafter, the wearable device 300 is described under the assumption that the wearable device 300 is a device having a form worn on the wrist of a user but is not limited thereto. Thus, the wearable device 300 may be any form of device that is wearable on the body of a user.

Additionally, it is assumed that the display device 100 is playing media content and this is described, but the present invention is not limited thereto. Thus, the display device 100 may be displaying an initial screen of the display device 100.

First, FIG. 5 is a view illustrating a user interface screen provided when a user does not wear the wearable device 300.

Referring to FIG. 5, if it is confirmed that the user does not wear the wearable device 300, the control unit 170 may control the display unit 180 thereby displaying a media content being played currently in full screen. The image acquisition unit 171 may capture a user's image positioned at the front of the display device 100. When an image for the wearable device 300 cannot be extracted from the user's captured image, the control unit 170 may control the display unit 180 thereby displaying a media content being played currently in full screen.

FIG. 6 is a view illustrating a user interface screen provided when a user wears the wearable device 300.

Referring to FIG. 6, if it is confirmed that the user wears the wearable device 300, the control unit 170 may control the display unit 180 thereby displaying a media content being played currently and received exercise information in one screen.

The image acquisition unit 171 may capture a user's image positioned at the front of the display device 100. When an image for the wearable device 300 is extracted from the user's captured image, the control unit 170 may control the display unit 180 thereby displaying a media content being played currently and received exercise information in one screen.

A screen of the display unit 180 may include a first screen 181 displaying the received exercise information and a second screen 183 displaying the media content being played currently. The size of the first screen 181 and the size of the second screen 183 may be identical to or different from each other.

According to an embodiment of the present invention, when the display device 100 and the wearable device 300 interlock with each other, exercise information displayed on the first screen 181 may be displayed on the wearable device as it is. That is, exercise information displayed on the display device 100 may be identical to exercise information displayed on the wearable device 300.

According to an embodiment of the present invention, user's exercise information displayed on the first screen 181 may represent information obtained by reflecting information on an exercise that a user performs before the display device 100 and the wearable device 300 interlock with each other.

According to the embodiment of FIG. 6, a user may easily check how much the user himself/herself exercises while watching media content.

Then, FIG. 7 is described.

FIG. 7 is a view illustrating a user interface screen provided when a plurality of wearable devices are recognized.

The control unit 170 of the display device 100 may recognize a plurality of wearable devices 300_1 and 300_2. According to an embodiment of the present invention, the plurality of wearable devices 300_1 and 300_2 may correspond to a plurality of users, respectively. That is, the plurality of wearable devices 300_1 and 300_2 may be devices that a plurality of users own respectively.

According to another embodiment of the present invention, the plurality of wearable devices 300_1 and 300_2 may be owned by one user and may be different types of devices.

In the embodiment of FIG. 7, it is assumed that the plurality of wearable devices 300_1 and 300_2 correspond to a plurality of user, respectively and this will be described.

When it is confirmed that each of a plurality of users wears the wearable devices 300_1 and 300_2, the control unit 170 may control the display unit 180 thereby displaying a media content being played currently and exercise information received from each of the plurality of wearable devices 300_1 and 300_2 in one screen.

The image acquisition unit 171 may capture an image for a plurality of users positioned at the front of the display device 100. When an image for the wearable devices 300_1 and 300_2 is extracted from the plurality of users' captured image, the control unit 170 may control the display unit 180 thereby displaying a media content being played currently and exercise information received from each of the wearable devices 300_1 and 300_2 in one screen.

A screen of the display unit 180 may include a first screen 181 displaying the exercise information received from the first wearable device 300_1, a second screen 183 displaying the media content being played currently, and a third screen 185 displaying the exercise information received from the second wearable device 3002.

The first screen 181 and the third screen 183 may be provided to correspond to a direction in which a user wearing a wearable device is positioned. In more detail, when a user wearing the first wearable device 300_1 is positioned at the left of the display device 100, the display device 100 may display the first screen 181 displaying the exercise information received from the first wearable device 300_1 at the left of the display unit 180. When a user wearing the second wearable device 300_2 is positioned at the right of the display device 100, the display device 100 may display the second screen 185 displaying the exercise information received from the second wearable device 300_2 at the right of the display unit 180.

Accordingly, each of a plurality of users may easily check exercise information corresponding to the his/her position through the display unit 180.

Figure 8:
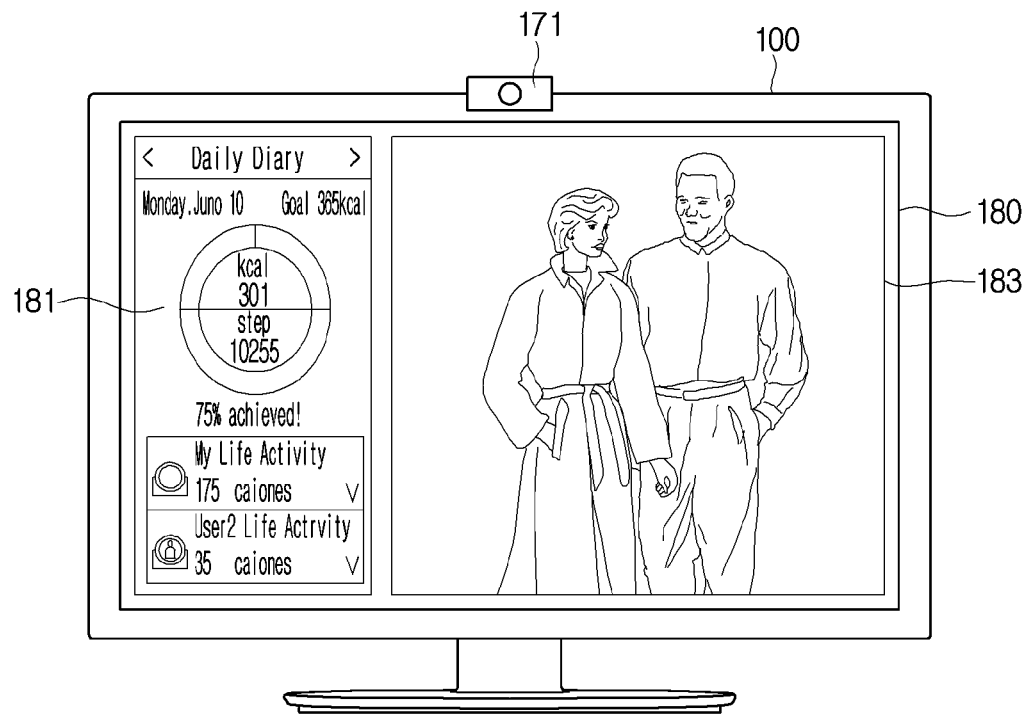
FIGS. 8 and 9 are views illustrating an interface screen provided on the basis of a wearing state of a wearable device and a user's exercise state according to an embodiment of the present invention.
Figure 8:
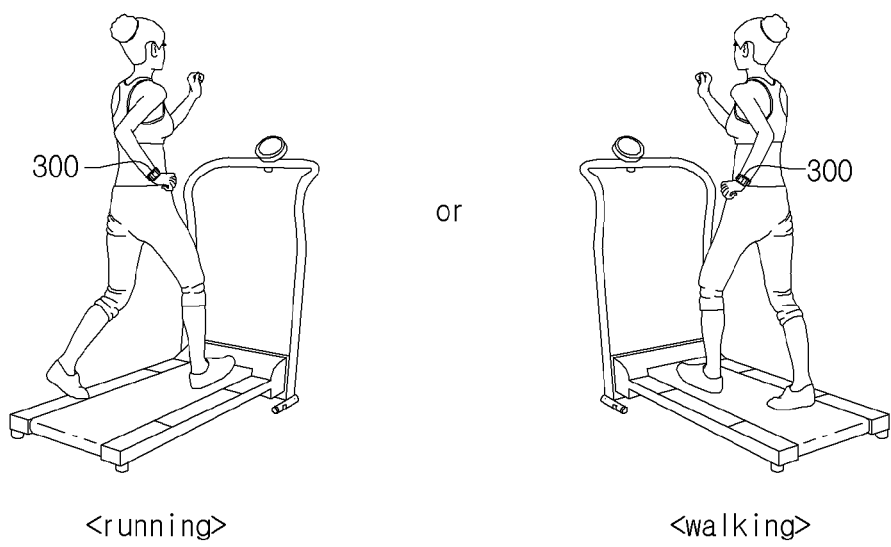
Figure 9:
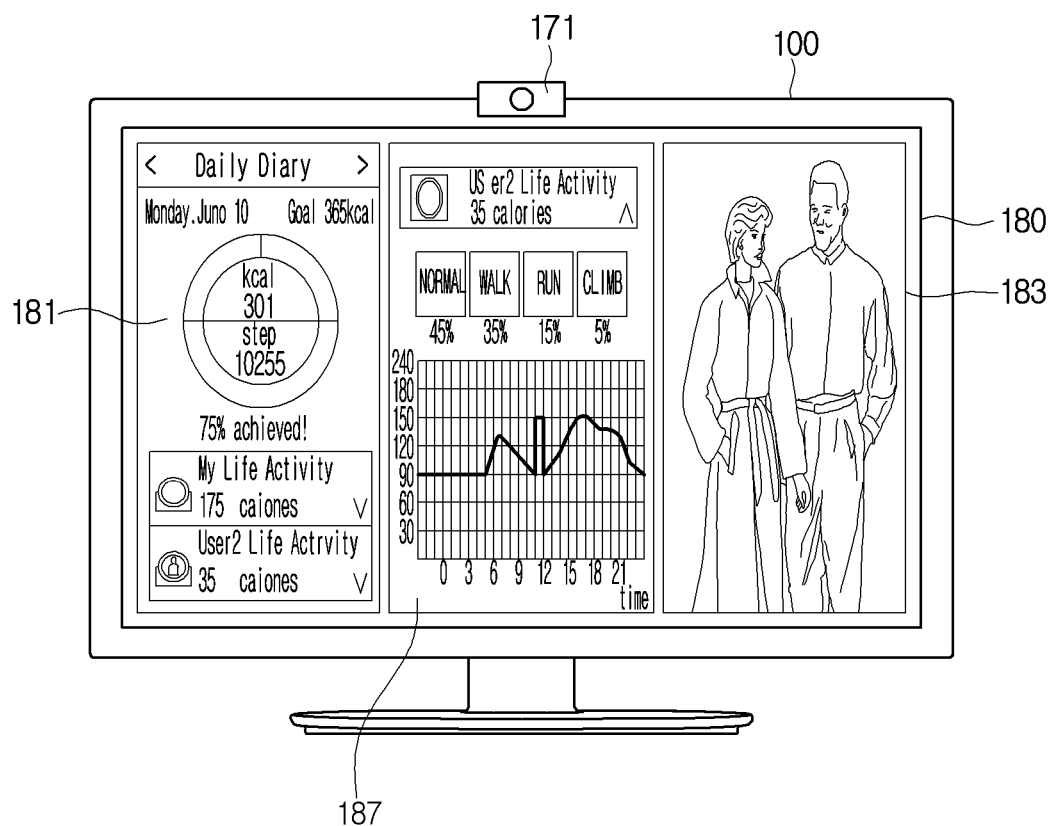
Figure 9:
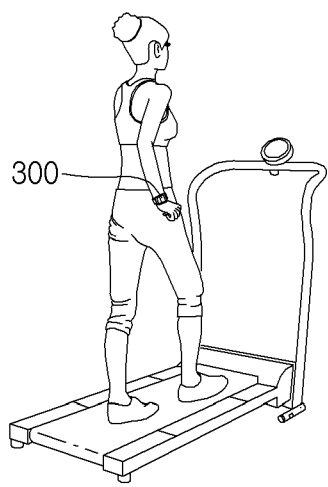

Then, FIGS. 8 and 9 are views illustrating an interface screen provided on the basis of a wearing state of a wearable device and a user's exercise state according to an embodiment of the present invention.

According to an embodiment of the present invention, a user's exercise state may be a state in which a user stops, walks slowly, walks fast, or runs by using exercise equipment. The user's exercise state may be classified when a user's exercise amount is greater or less than a reference exercise amount.

First, FIG. 8 is a view illustrating a user interface screen provided when a user wears the wearable device 300 and a user's exercise amount is greater than a reference exercise amount.

Referring to FIG. 8, when a user wears the wearable device 300 and a user's exercise amount is greater than a reference exercise amount, the control unit 170 may determine that the user's exercise amount is greater than the reference exercise amount and may simultaneously display a first screen 181 displaying the user's exercise information and a second screen 183 displaying a media content being played in one screen. Especially, in this case, the control unit 170 may display the first screen 181 displaying the user's exercise information to be smaller than the second screen 183 displaying the media content being played.

For example, when a user wearing the wearable device 300 runs or walks, the control unit 170 may determine that a user's exercise amount is greater than a reference exercise amount and may simultaneously display the first screen 181 displaying the user's exercise information and the second screen 183 displaying a media content being played in one screen. Additionally, when a user wearing the wearable device 300 runs or walks, the control unit 170 may determine that a user's exercise amount is greater than a reference exercise amount and may provide the first screen 181 displaying the user's exercise information to be smaller than the second screen 183 displaying the media content being played in one screen.

Since a user focuses on watching media content while running or walking, the control unit 170 may provide the first screen 181 displaying the user's exercise information to be smaller than the second screen 183 displaying the media content being played in one screen.

According to another embodiment of the present invention, when an exercise amount of a user wearing the wearable device 300 is greater than a reference exercise amount, the control unit 170 may increase an audio output of a media content being played. That is, when a user starts exercising, since the audio of media content is not heard well, if a user's exercise amount is greater than a reference exercise amount, the control unit 170 increases an audio output of the media content to allow the user to focus on watching the media content.

Then, FIG. 9 will be described.

FIG. 9 is a view illustrating a user interface screen provided when a user wears the wearable device 300 and a user's exercise amount is less than a reference exercise amount.

When a user wearing the wearable device 300 stops, the control unit 170 may determine that a user's exercise amount is less than a reference exercise amount and may simultaneously display a first screen 181 displaying the user's exercise information, a second screen 183 displaying a media content being played, and a third screen 187 displaying a user's exercise result in one screen.

According to an embodiment of the present invention, the size of a screen displaying user's exercise information when an exercise amount of a user wearing the wearable device 300 is greater than a reference exercise amount may be smaller than the size of a screen displaying user's exercise when an exercise amount of a user wearing the wearable device 300 is less than a reference exercise amount. Since a user further focuses on watching media content while running or walking, the control unit 170 may display the size of a screen displaying the user's exercise information to be smaller compared to when the user stops.

According to another embodiment of the present invention, when a user's exercise amount is less than a reference exercise amount, the control unit 170 may change the first screen 181 displaying user's exercise information into the third screen 187 displaying a user's exercise result and may then display it. That is, when a user's exercise amount is less than a reference exercise amount, the control unit 170 may display only the third screen 187 displaying a user's exercise result and the second screen 183 displaying a media content being played.

Again, FIG. 4 will be described.

Then, the control unit 170 recognizes a user's hand gesture in operation S113.

That is, the control unit 170 may recognize a user's hand gesture on the basis of an image of a user wearing the wearable device 300. In more detail, the image acquisition unit 171 may obtain an image of a user disposed at the display device front and may recognize a user's hand gesture by using the obtained user's image. The storage unit 140 may store a plurality of hand gesture patterns and the control unit 170 may compare a recognized hand gesture with a pre-stored hand gesture pattern. When a similarity between a recognized hand gesture and a pre-stored hand gesture pattern exceeds a reference similarity on the basis of a comparison result, the control unit 170 may determine that the recognized hand gesture matches the pre-stored hand gesture pattern. The reference similarity may be a threshold for recognizing a recognized hand gesture as a pre-stored hand gesture.

On the basis of at least one of whether the wearable device 300 is worn on the hand corresponding to a recognized hand gesture and a user's exercise state, the control unit 170 selectively controls a function of the display device 100 or a function of the wearable device 300 in operation S115.

According to an embodiment of the present invention, on the basis of whether the wearable device 300 is worn on the hand corresponding to a recognized hand gesture, the control unit 170 selectively controls a function of the display device 100 corresponding to the recognized hand gesture or a function of the wearable device 300 corresponding to the recognized hand gesture.

In more detail, when the wearable device 300 is worn on the hand corresponding to a recognized hand gesture, the control unit 170 may control a function of the wearable device 300 corresponding to the recognized hand gesture and when the wearable device 300 is not worn on the hand corresponding to a recognized hand gesture, the control unit 170 may control a function of the display device 100 corresponding to the recognized hand gesture.

This will be described with reference to FIGS. 10 and 13.

FIGS. 10 to 13 are views illustrating a process for controlling a function of a display device corresponding to a recognized hand gesture or a function of a wearable device corresponding to a recognized hand gesture on the basis of whether the wearable device is worn on the hand corresponding to a recognized hand gesture.

Figure 10:
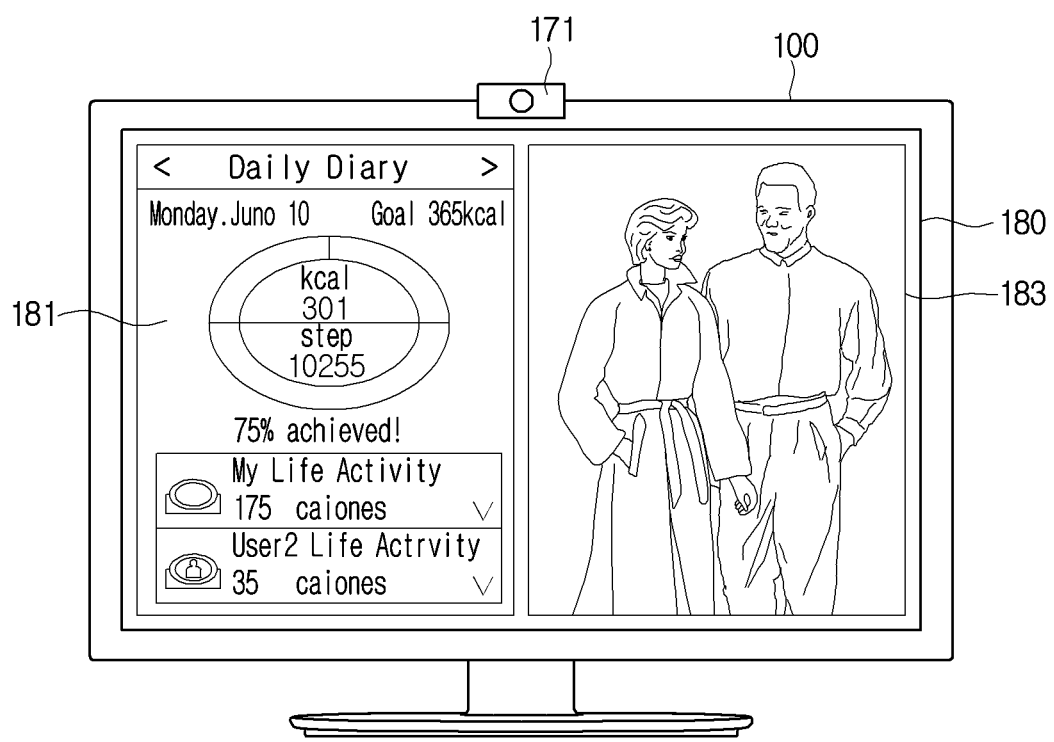
FIGS. 10 to 13 are views illustrating a process for controlling a function of a display device corresponding to a recognized hand gesture or a function of a wearable device corresponding to a recognized hand gesture on the basis of whether the wearable device is worn on the hand corresponding to a recognized hand gesture.
Figure 10:
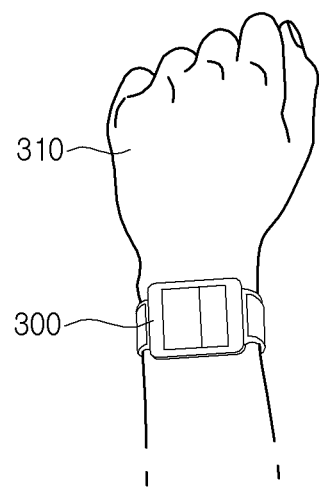
Figure 11:
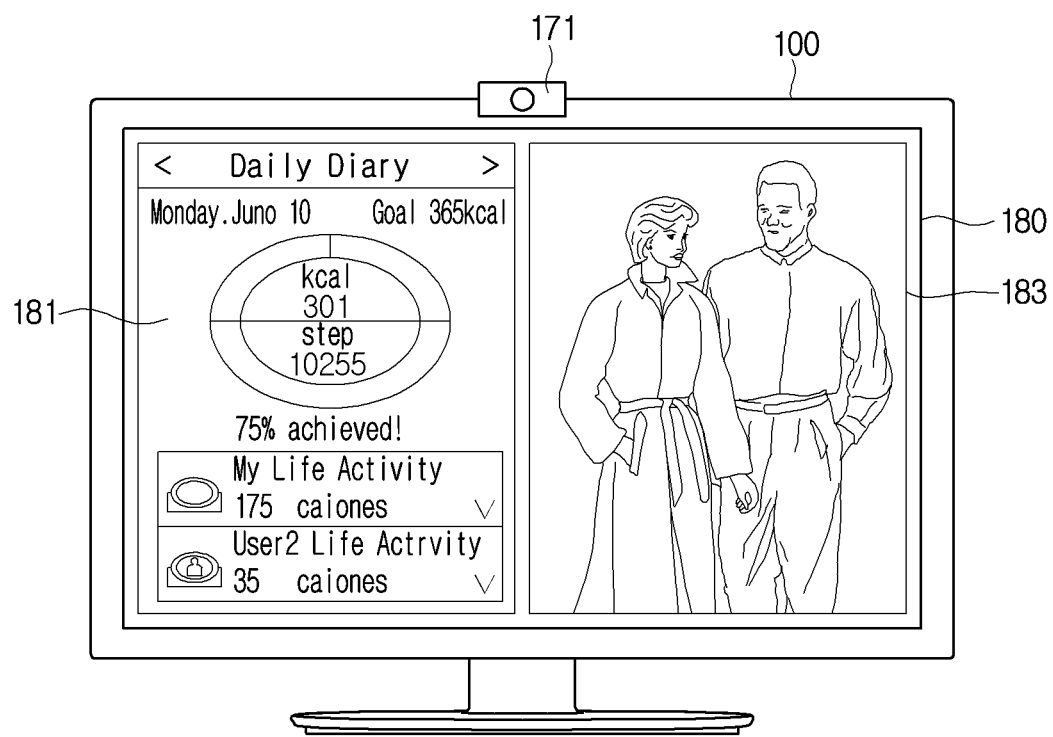
Figure 11:
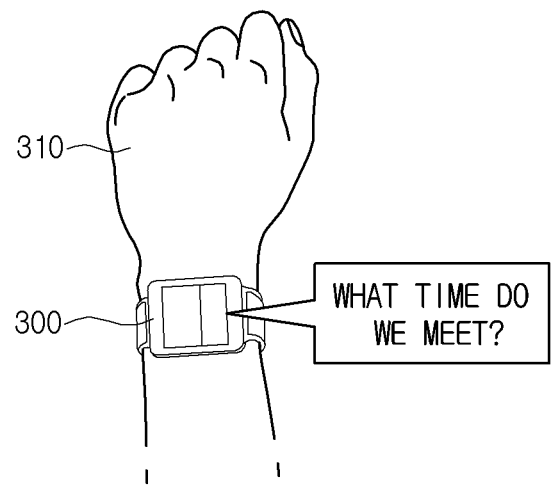

First, referring to FIGS. 10 to 11, when the wearable device is worn on the hand corresponding to a recognized hand gesture, a process that the display device 100 controls a function of the wearable device 300 is described.

As shown in FIG. 10, the control unit 170 of the display device 100 may recognize a hand gesture 310 of a user holding a fist and the wearable device 300 worn on the hand corresponding to the hand gesture 310. The control unit 170 may control a function of the wearable device 300 corresponding to the recognized user's hand gesture 310. For this, the storage unit 140 of the display device 100 may store a plurality of hand gestures and respective functions of the wearable device 300 corresponding to the plurality of hand gestures. The control unit 170 may search for a function of the wearable device 300 corresponding to the recognized hand gesture 310 through the storage unit 140 and may transmit a control command to the wearable device 300 so as to perform a function corresponding to the found search result to be performed in the wearable device 300.

For example, when the hand gesture 310 shown in FIG. 10 is a gesture corresponding to a function for displaying a message that the wearable device 300 receives, the control unit 170 may transmit a control instruction for this. As shown in FIG. 11, the wearable device 300 receiving a control command for displaying a message may display a received message.

Then, FIGS. 12 and 13 will be described.

Figure 12:
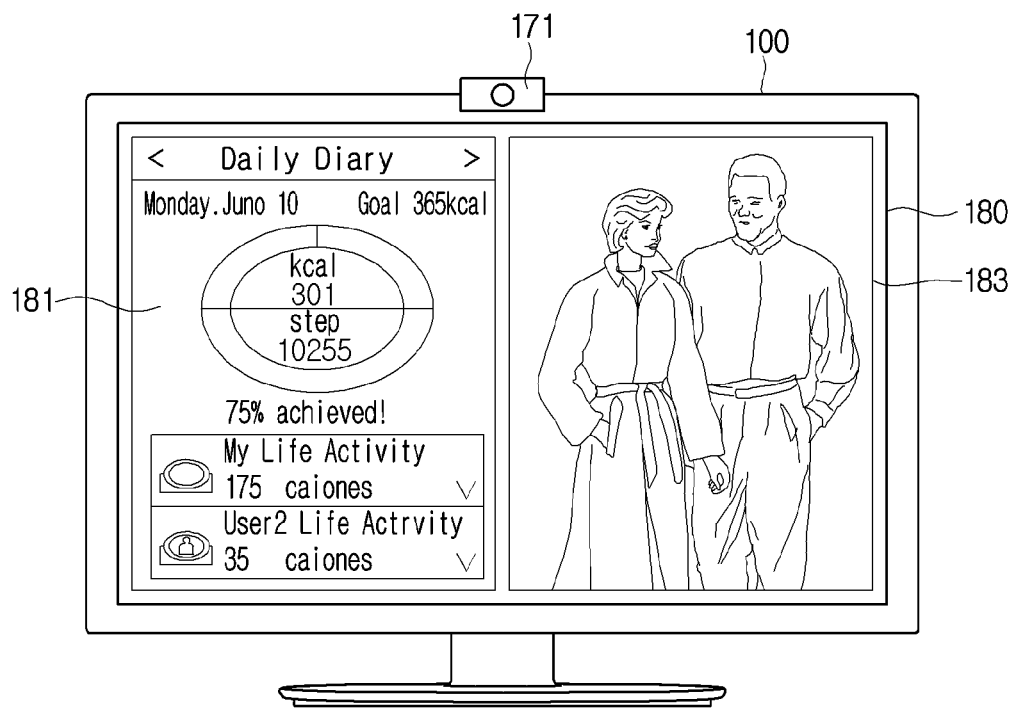
Figure 12:
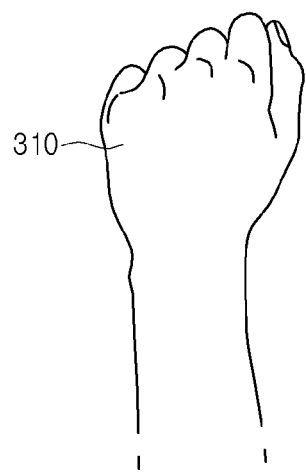
Figure 13:
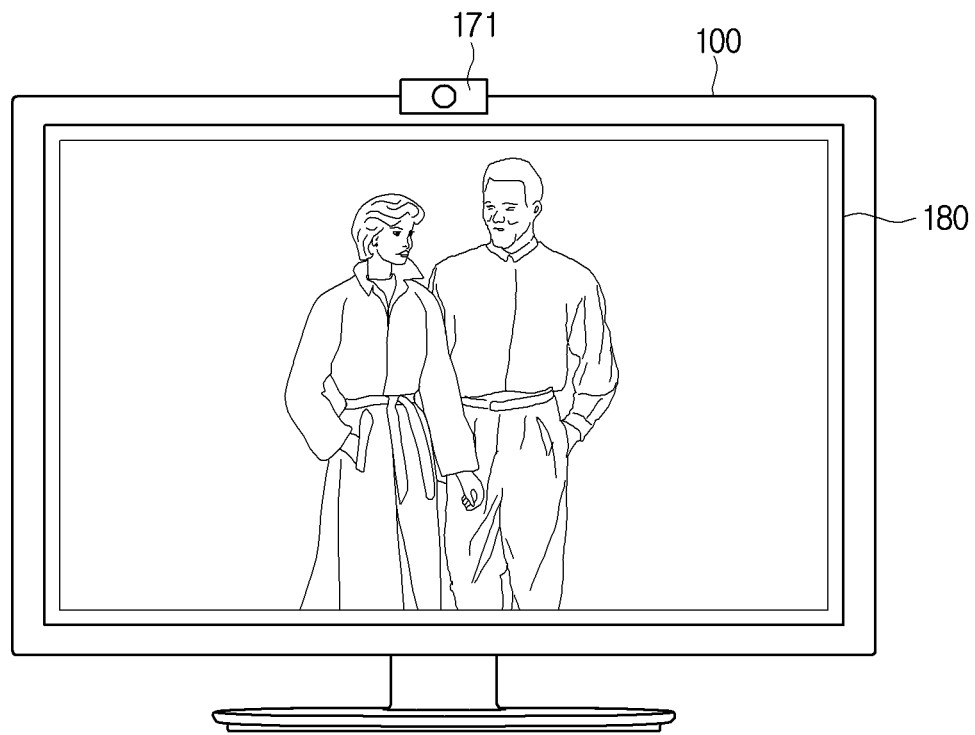
Figure 13:
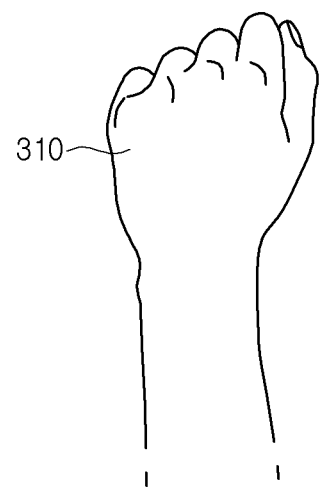

FIGS. 12 and 13 are views illustrating a process for controlling a function of the display device 100 when a wearable device is not worn on the hand corresponding to a recognized hand gesture.

As shown in FIG. 12, the control unit 170 of the display device 100 may recognize a hand gesture 310 of a user holding a fist and the wearable device 300 not worn on the hand corresponding to the hand gesture 310. The control unit 170 may control a function of the display device 100 corresponding to the recognized user's hand gesture 310. For this, the storage unit 140 of the display device 100 may store a plurality of hand gestures and respective functions of the display device 300 corresponding to the plurality of hand gestures. The control unit 170 may search for a function of the display device 100 corresponding to the recognized hand gesture 310 through the storage unit 140 and may control a function of the display device 300 corresponding to the found search result.

For example, when the hand gesture 310 shown in FIG. 12 is a gesture corresponding to a function for displaying a media content being played in the display device 100 in full screen, the control unit 170, as shown in FIG. 13, may display the media content being played in full screen.

Again, FIG. 4 will be described.

According to another embodiment of the present invention, the control unit 170 may control a function of the display device 100 corresponding to a recognized hand gesture or a function of the wearable device 300 corresponding to a recognized hand gesture on the basis of a user's exercise state.

In more detail, regardless of whether the wearable device 300 is worn on the hand corresponding to a recognized user's hand gesture, on the basis of a user's exercise state, the control unit 170 may control a function of the display device 100 or a function of the wearable device 300 corresponding to a recognized hand gesture. This will be described with reference to FIGS. 14 and 21.

FIGS. 14 to 21 are views illustrating a process for controlling a function of a display device corresponding to a recognized user's hand gesture or a function of a wearable device corresponding to a recognized hand gesture on the basis of a user's exercise state according to an embodiment of the present invention.

First, referring to FIGS. 14 to 15, a process for controlling a function of a display device corresponding to a recognized user's hand gesture on the basis of a user's exercise state according to an embodiment of the present invention will be described.

Figure 14:
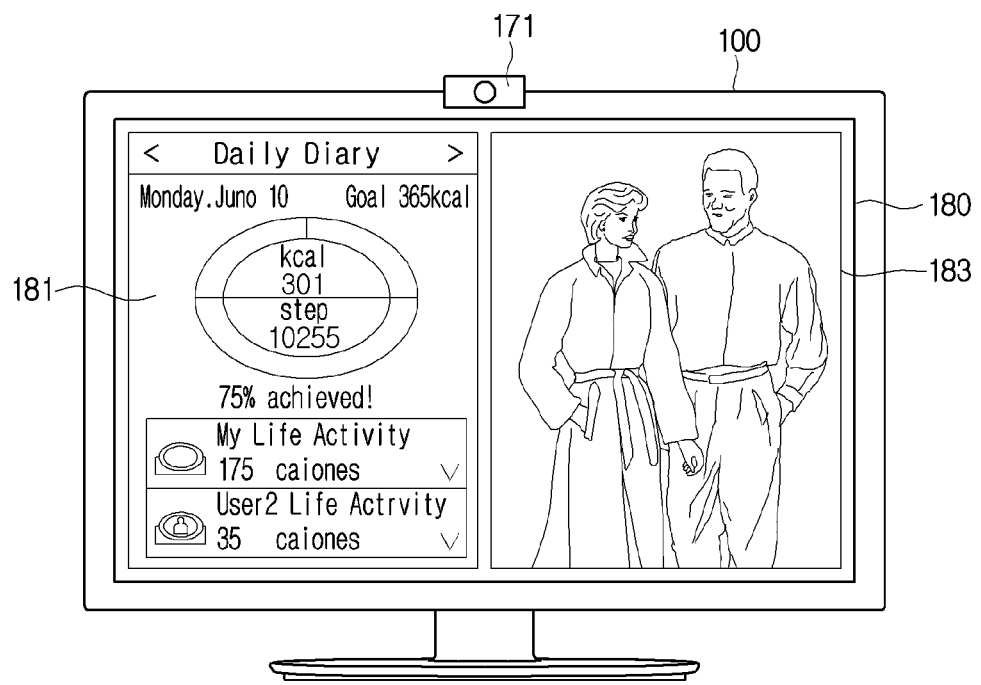
FIGS. 14 to 21 are views illustrating a process for controlling a function of a display device corresponding to a recognized user's hand gesture or a function of a wearable device corresponding to a recognized hand gesture on the basis of a user's exercise state according to an embodiment of the present invention.
Figure 14:
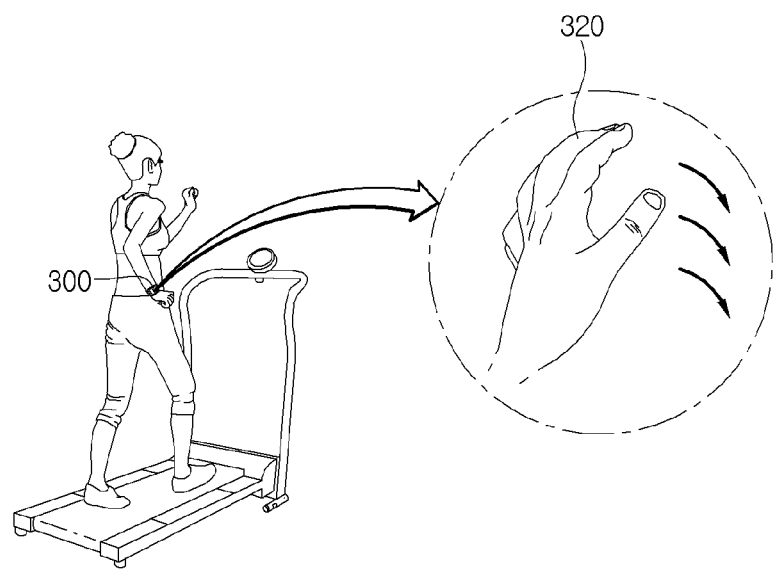

As shown in FIG. 14, when a hand gesture 320 that a user moves the hand from the left to the right (or the right to the left) while extending all the fingers is recognized and a user's exercise amount is greater than a reference exercise amount, the control unit 170 may change a media content being played on the second screen 183 into another media content. For example, when the hand gesture 320 that a user moves the hand from the left to the right (or the right to the left) is a function for changing a channel of a broadcast program and a user's exercise amount is greater than a reference exercise amount, as shown in FIG. 15, the control unit 170 may change a channel displayed on the second screen 183 according to the recognized hand gesture 320. A function corresponding to the hand gesture 320 is just exemplary and may correspond to part of a relatively simple manipulation function of the display device 100, for example, volume adjustment.

Figure 15:
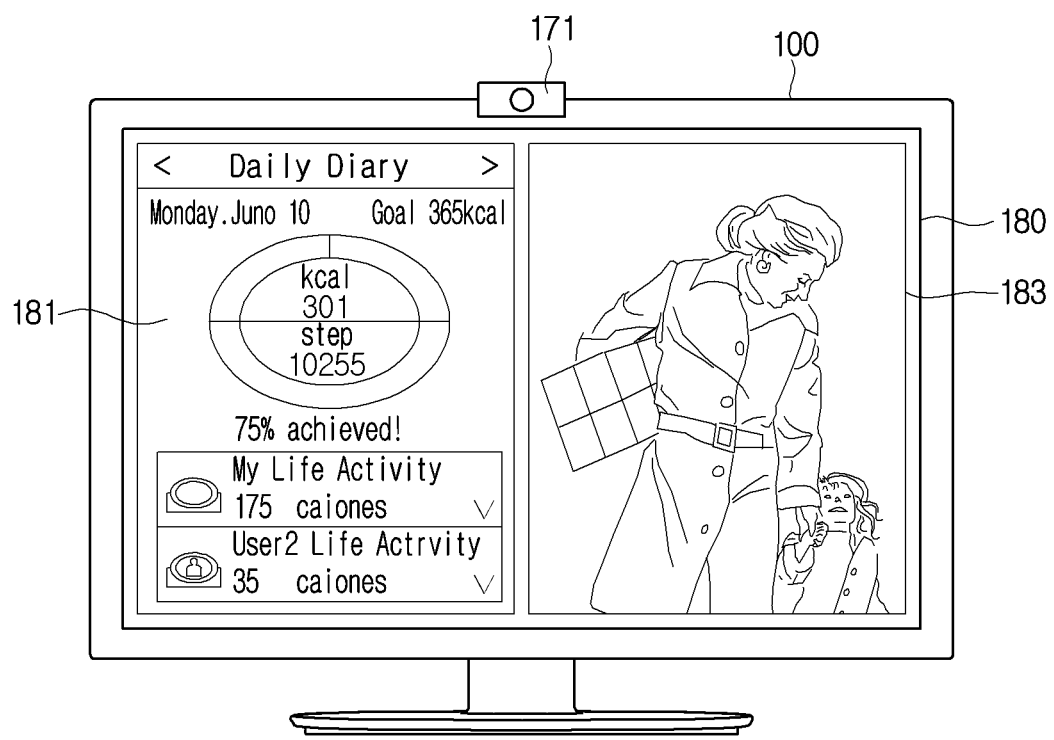
Figure 15:
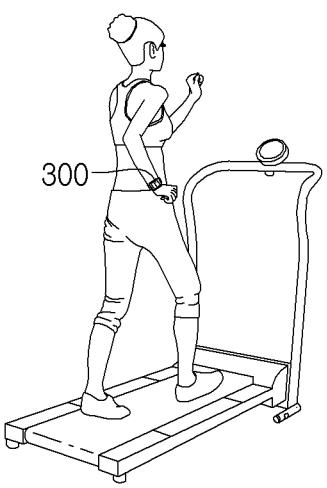

According to the embodiments of FIGS. 14 and 15, since it is difficult for the display device 100 to recognize a complex hand gesture due to a lot of movements while a user exercises, a simple hand gesture is required to control a function of a display device.

Then, referring to FIGS. 16 to 17, a process for controlling a function of a wearable device corresponding to a recognized user's hand gesture on the basis of a user's exercise state according to an embodiment of the present invention will be described.

Figure 16:
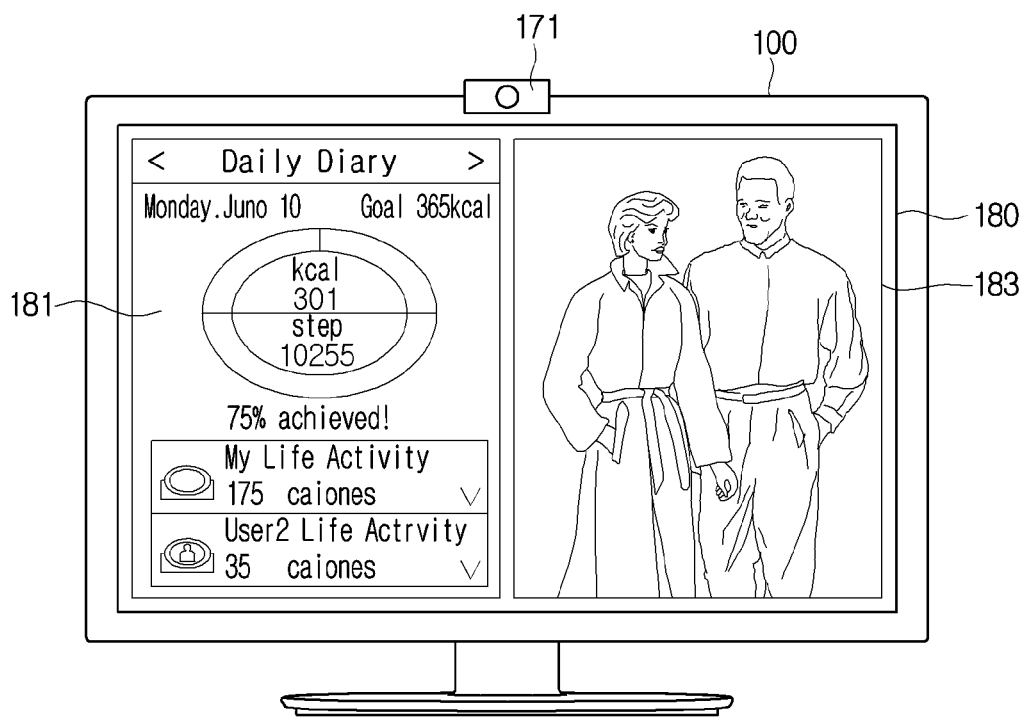
Figure 16:
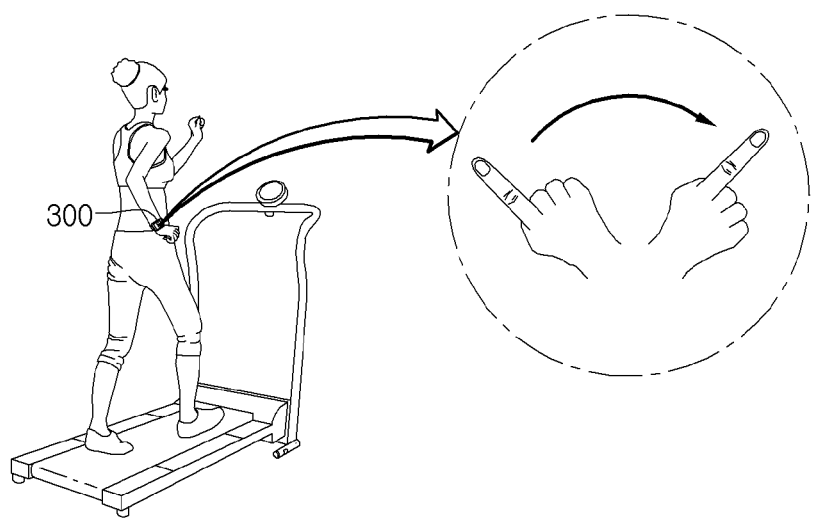

As shown in FIG. 16, when a hand gesture 320 that a user moves the hand from the left to the right (or the right to the left) while extending only the index finger is recognized and a user's exercise amount is greater than a reference exercise amount, the control unit 170 may control a function of the wearable device 300.

It is assumed that a hand gesture 330 that a user moves the hand from the left to the right (or the right to the left) while extending the index finger corresponds to a function of the wearable device 300 displaying weather information. When the hand gesture 330 is recognized and a user's exercise amount is greater than a reference exercise amount, the control unit 170 may transmit a control instruction displaying weather information, that is, a function corresponding to the recognized hand gesture 330, to the wearable device 300. The wearable device 300 may receive a control command corresponding to weather information display from the display device 100 and may then display weather information as shown in FIG. 17.

Figure 17:
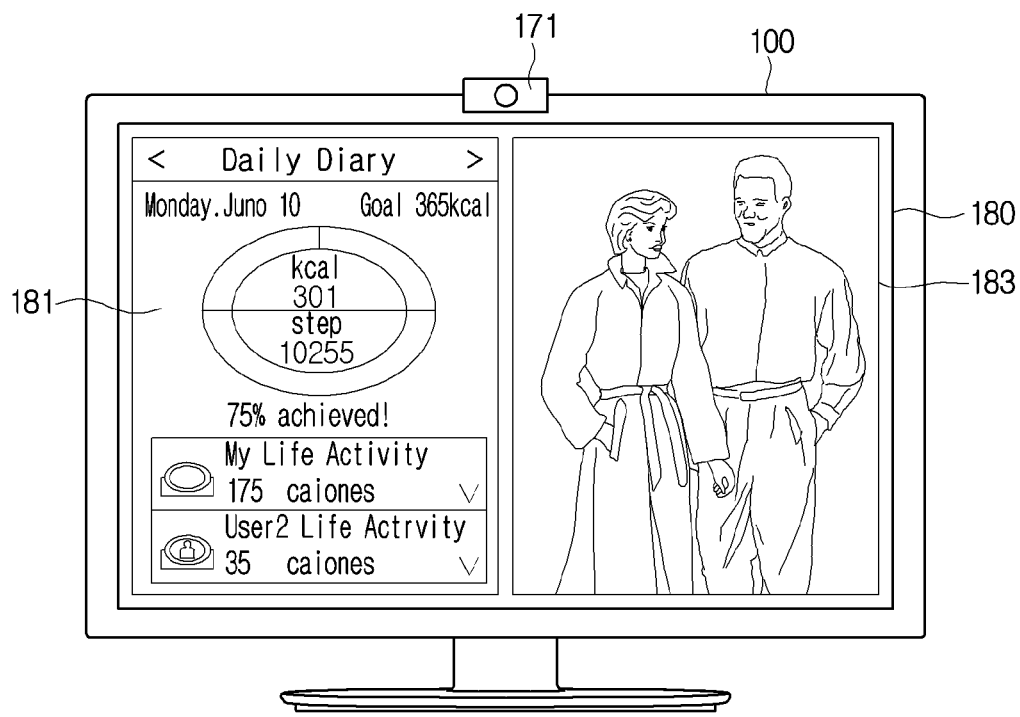
Figure 17:
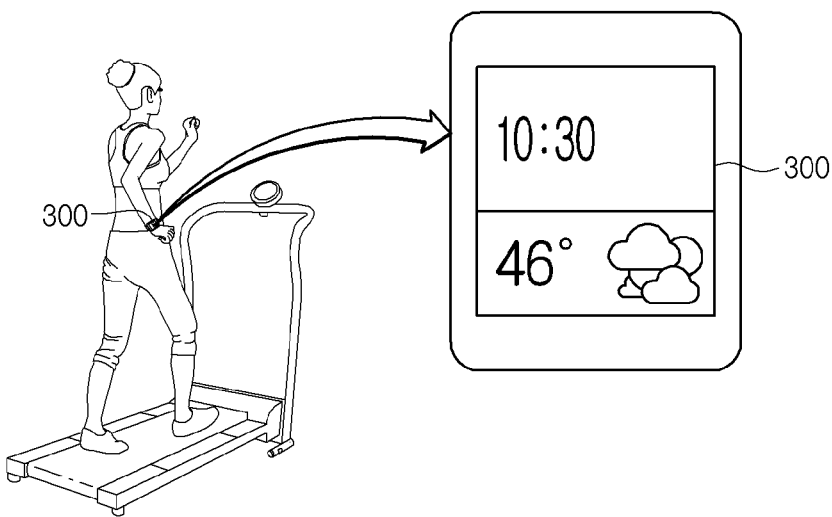

According to the embodiments of FIGS. 16 and 17, since it is difficult for the display device 100 to recognize a complex hand gesture due to a lot of movements while a user exercises, a simple hand gesture is required to control a function of a wearable device. Additionally, while a user exercises, a function of the wearable device 300 may be controlled with a simple hand gesture.

Then, referring to FIGS. 18 to 21, according to another embodiment of the present invention, a process for controlling a function of a wearable device corresponding to a recognized hand gesture or a function of a display device corresponding to a recognized hand gesture on the basis of a user's exercise state will be displayed.

According to the embodiments of FIGS. 18 to 21, when a user's exercise amount exceeds a reference exercise amount, regardless of the direction of a hand wearing the wearable device 300, the control unit 170 may control a function of the display device 100 or a function of the wearable device 300 through one of a hand gesture for the right hand and a hand gesture for the left.

In more detail, when a user's exercise amount exceeds a reference exercise amount, regardless of the direction of a hand wearing the wearable device 300, a hand gesture for the right hand may control a function of the display device 100 and a gesture for the left hand may control a function of the wearable device 300. On the contrary, when a user's exercise amount exceeds a reference exercise amount, regardless of the direction of a hand wearing the wearable device 300, a hand gesture for the left hand may control a function of the display device 100 and a gesture for the right hand may control a function of the wearable device 300.

Figure 18:
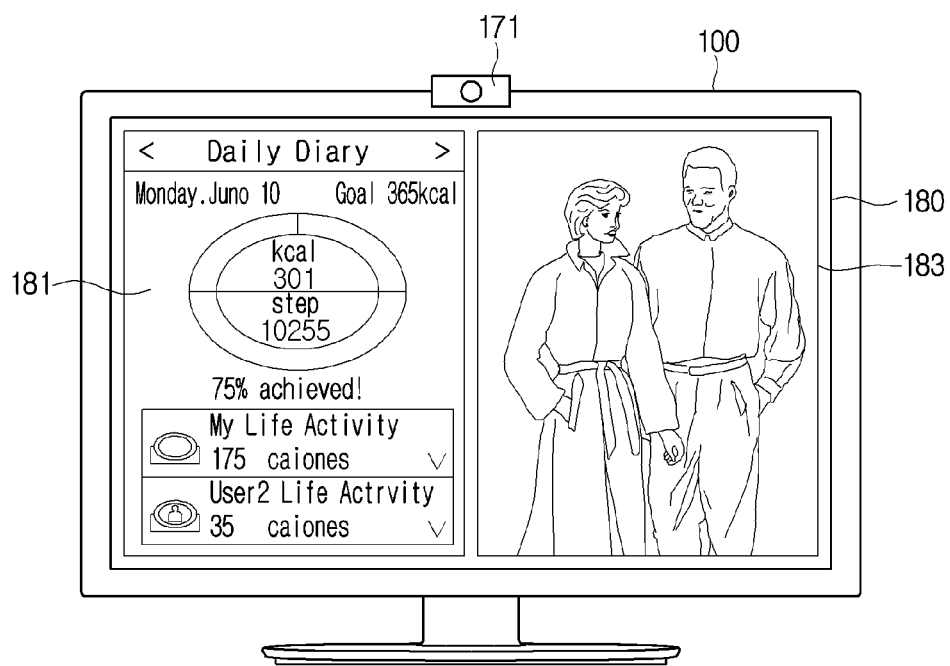
Figure 18:
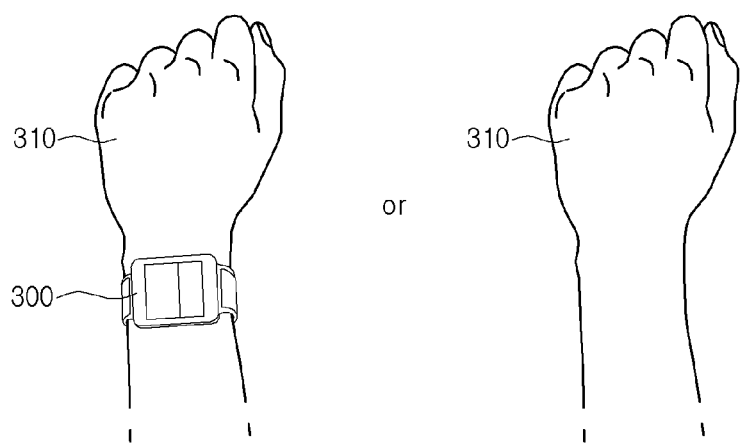
Figure 19:
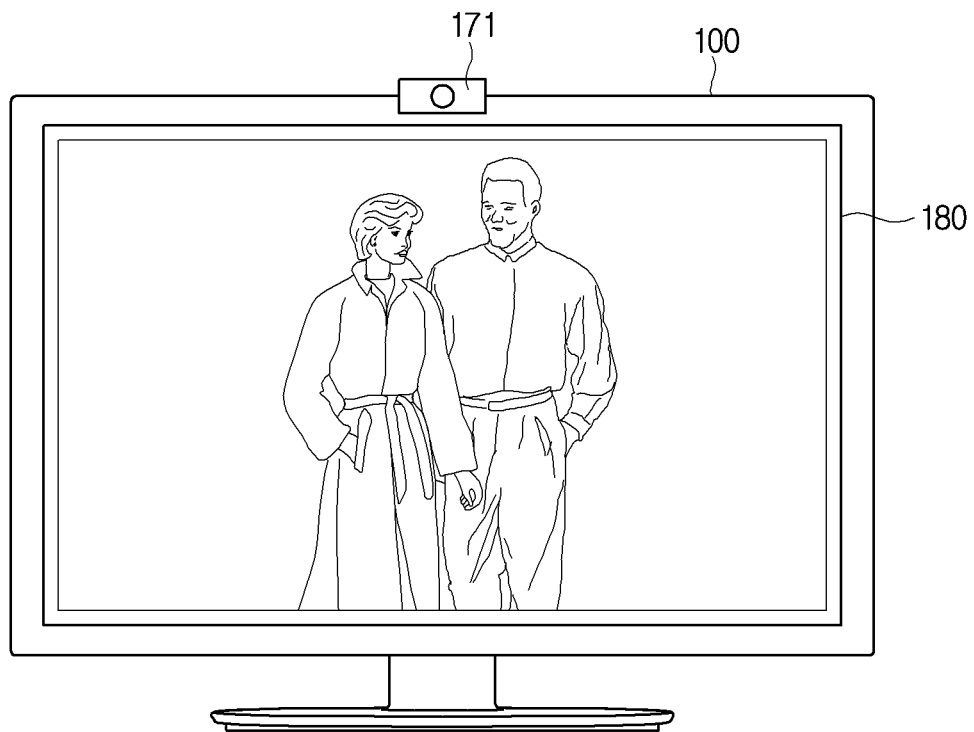

First, FIGS. 18 and 19 are views illustrating a process for controlling a function of the display device 100 when a user takes a gesture for the left hand during exercise.

In the case of FIG. 18, it is assumed that the wearable device 300 is worn on the user's left hand or the wearable device 300 is not worn.

When a user's exercise amount is greater than a reference exercise amount and a hand corresponding to the recognized hand gesture 310 is the left hand, regardless of whether the wearable device 300 is worn on the user's left hand, the control unit 170 may control a function of the display device 100 corresponding to the recognized hand gesture. That is, when a function corresponding to the hand gesture 310 is a function for displaying a media content being played in full screen, as shown in FIG. 19, the control unit 170 may display a media content being played on the second screen 183 in full screen.

Then, FIGS. 20 and 21 will be described.

Figure 20:
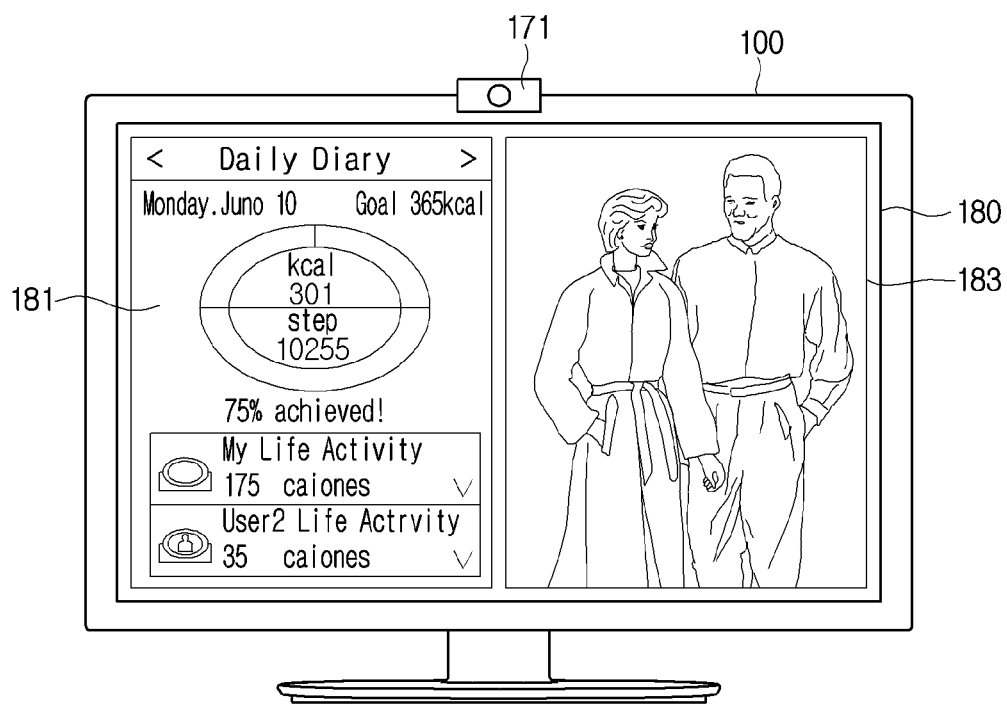
Figure 20:
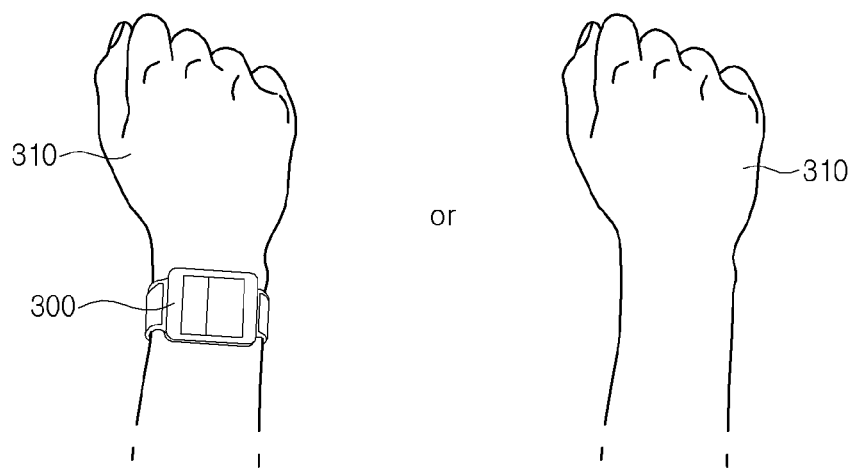
Figure 21:
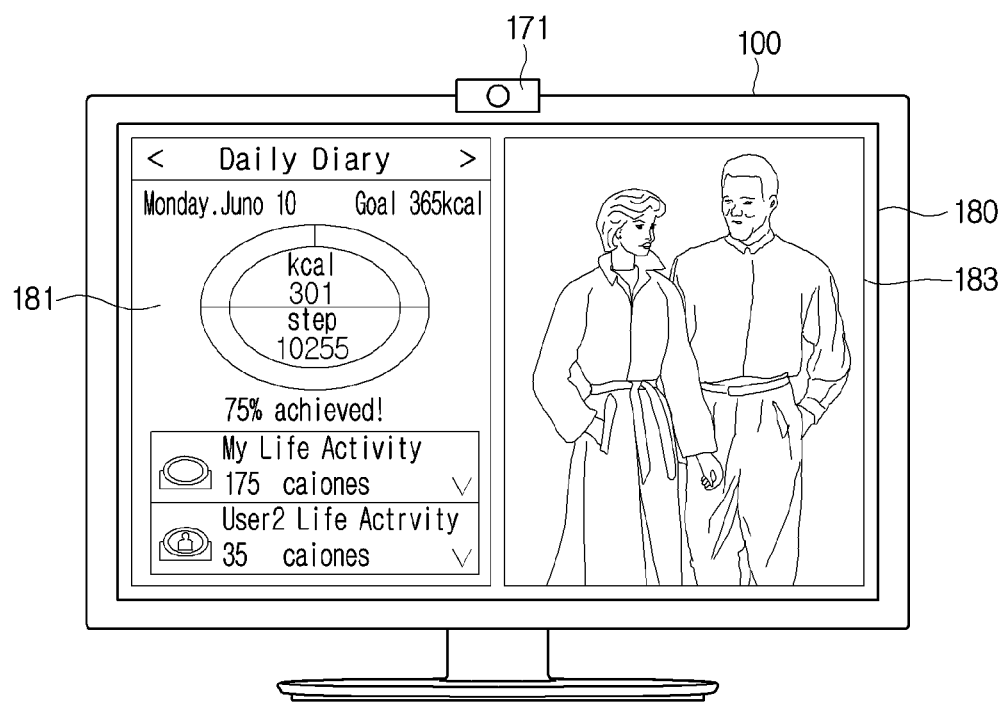
Figure 21:
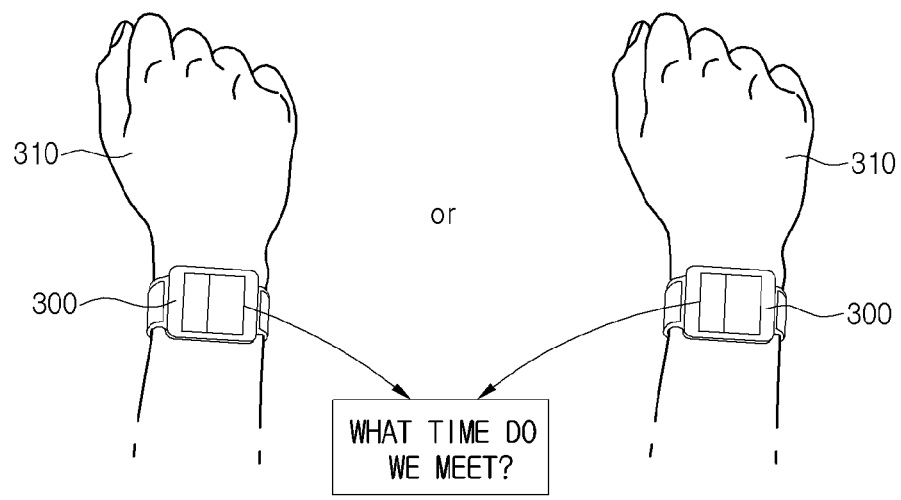

FIGS. 20 and 21 are views illustrating a process for controlling a function of the wearable device 300 when a user takes a gesture for the right hand during exercise.

In the case of FIG. 20, it is assumed that the wearable device 300 is worn on the user's right hand or the wearable device 300 is not worn.

When a user's exercise amount is greater than a reference exercise amount and a hand corresponding to the recognized hand gesture 310 is the right hand, regardless of whether the wearable device 300 is worn on the user's right hand, the control unit 170 may control a function of the wearable device 300 corresponding to the recognized hand gesture. That is, when a function corresponding to the hand gesture 340 is a function for displaying a message that the wearable device 300 receives, as shown in FIG. 21, the control unit 170 may transmit a control command for displaying a received message to the wearable device 300 and the wearable device 300 may display the received message in response to the received control command.

Again, FIG. 4 will be described.

According to another embodiment, when a user's hand gesture is recognized and a user's exercise amount is less than a reference exercise amount, the control unit 170 may control a function of the display device 100 corresponding to the recognized hand gesture. That is, in this case, the control unit 170 may determine that a user does not exercise and may then control only a function of the display device 100 corresponding to the recognized user's hand gesture.

Then, the control unit 170 checks whether a user stops exercising through the received user's exercise information in operation S117.

When it is confirmed that the user stops exercising, the control unit 170 provides a user's exercise result in operation S119 and when it is confirmed that the user keeps exercising, the control unit 170 returns to operation S107.

According to an embodiment of the present invention, on the basis of exercise information received from the wearable device 300, when a user's exercise amount is less than a reference exercise amount for a predetermined time, it is confirmed that the user stops exercising. In more detail, when a user's exercise amount is greater than a reference exercise amount for a predetermined time and then a user's exercise amount is less than the reference exercise amount for a predetermined time, the control unit 170 confirms that a user stops exercising.

According to another embodiment of the present invention, the control unit 170 may confirm that a user stops exercising according to a user's hand gesture representing exercise stop and may perform a control to display an exercise result through the display unit 180.

Operation S115 to operation S119 will be described in more detail with reference to FIGS. 22 and 23.

Figure 22:
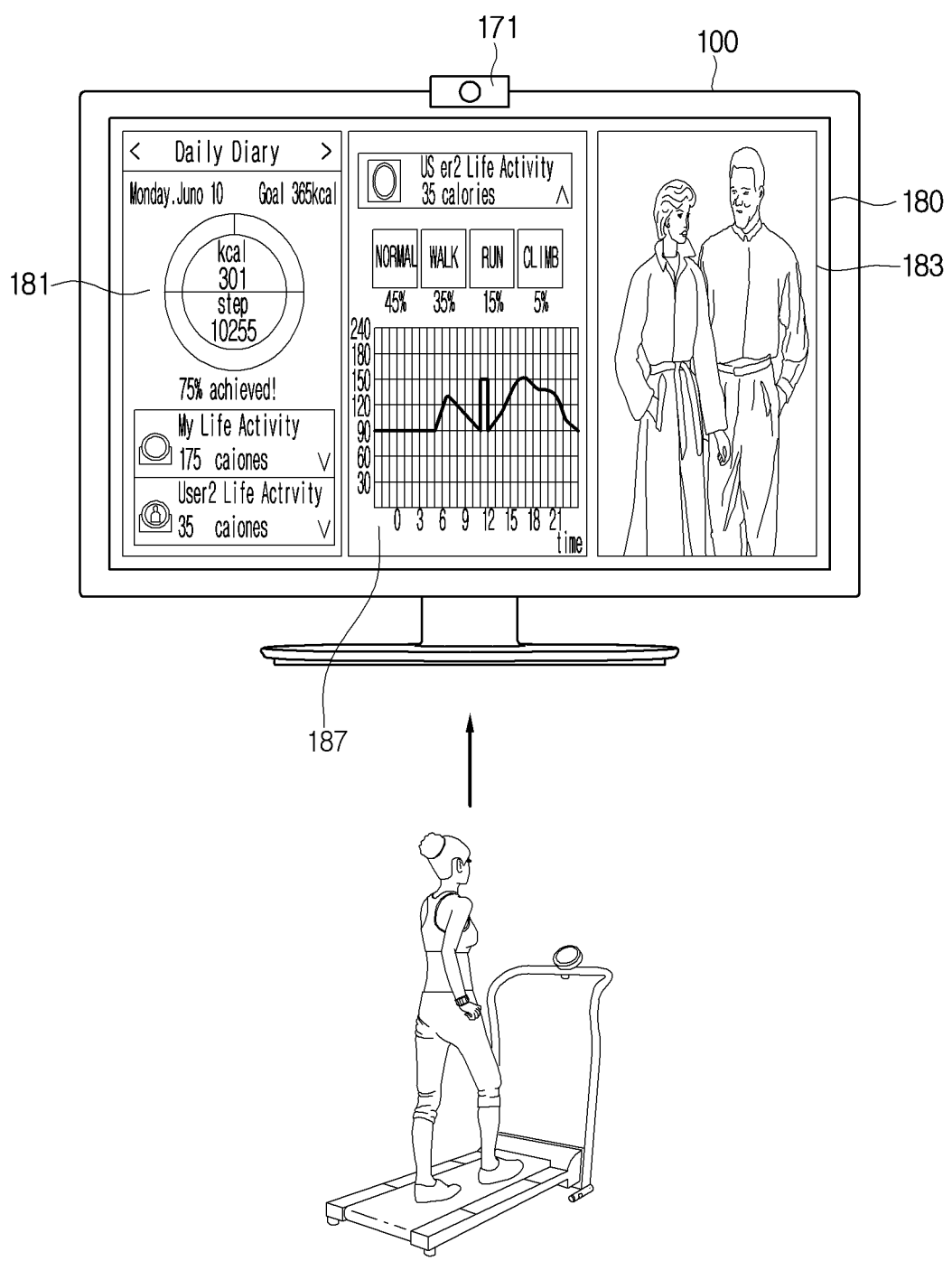
FIGS. 22 and 23 are views when it is confirmed that a user stops exercising and a user's exercise result is displayed according to an embodiment of the present invention.
Figure 23:
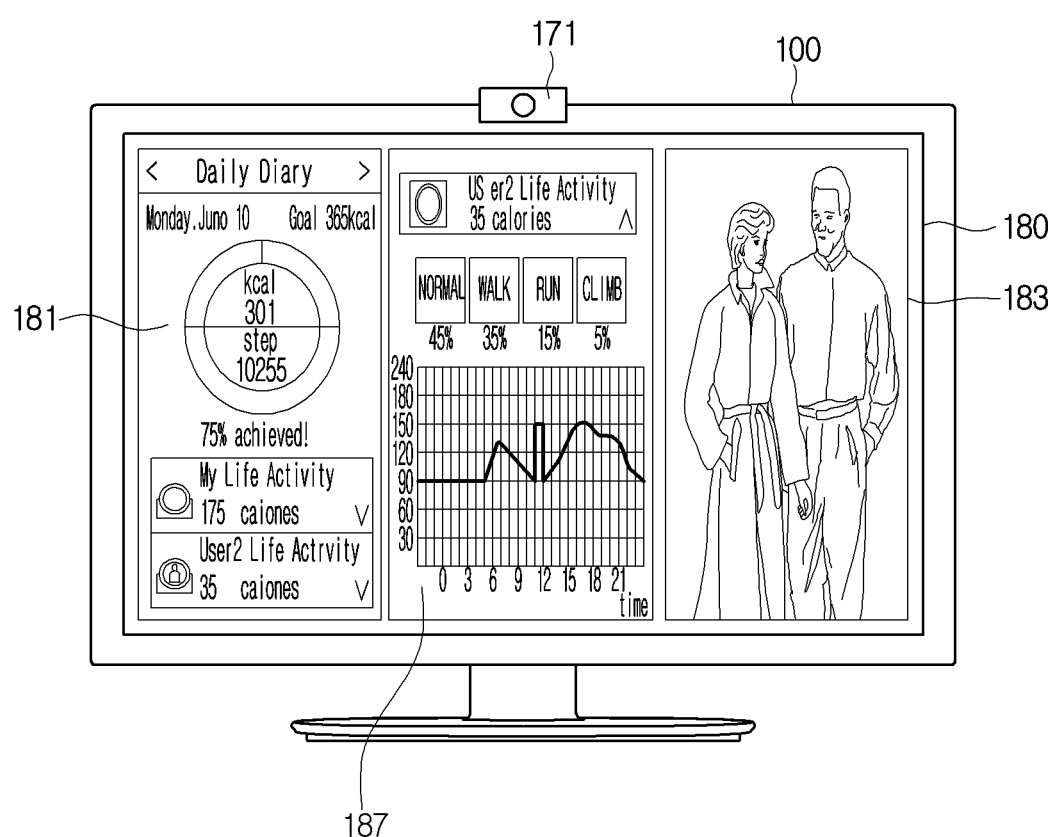
Figure 23:
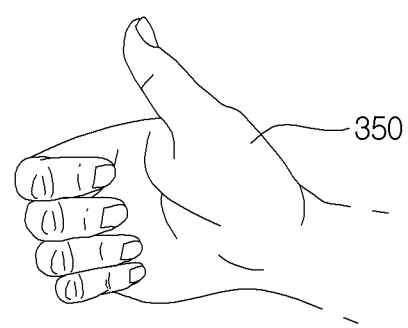

FIGS. 22 and 23 are views when it is confirmed that a user stops exercising and a user's exercise result is displayed according to an embodiment of the present invention.

First, FIG. 22 is a view when a user's exercise result is provided on the basis of exercise information received from the wearable device 300.

Referring to FIG. 22, when a user stop exercising, that is, when a user's exercise amount is less than a reference exercise amount for a predetermined time, the control unit 170 may provide a user's exercise result through the third screen 187. The control unit 170 may receive user's exercise information from the wearable device 300 in real time and may confirm that a user stops exercising on the basis of the received exercise information. When it is determined that a user stop exercising, the control unit 170 may display a user's exercising result through the third screen 187 of the display unit 180.

Then, FIG. 23 is described.

FIG. 23 is a view when a user's exercise result is provided on the basis of a recognized hand gesture.

Referring to FIG. 23, a hand gesture 350 representing that a user stops exercising is recognized, the control unit 170 may provide a user's exercise result through the third screen 187. That is, when a hand gesture 350 extending only the thumb among fingers is recognized, the control unit 170 may recognize that a user stops exercising and may then display an exercise result through the third screen 187.

According to an embodiment of the present invention, the control unit 170 may provide a user's exercise result through the display unit 180 regardless of the direction of a hand corresponding to the recognized hand gesture 350.

According to another embodiment of the present invention, the control unit 170 may provide a user's exercise result through the display unit 180 regardless of the wearable device 300 is worn on a hand corresponding to the recognized hand gesture 350.

Then, FIG. 24 will be described.

Figure 24:
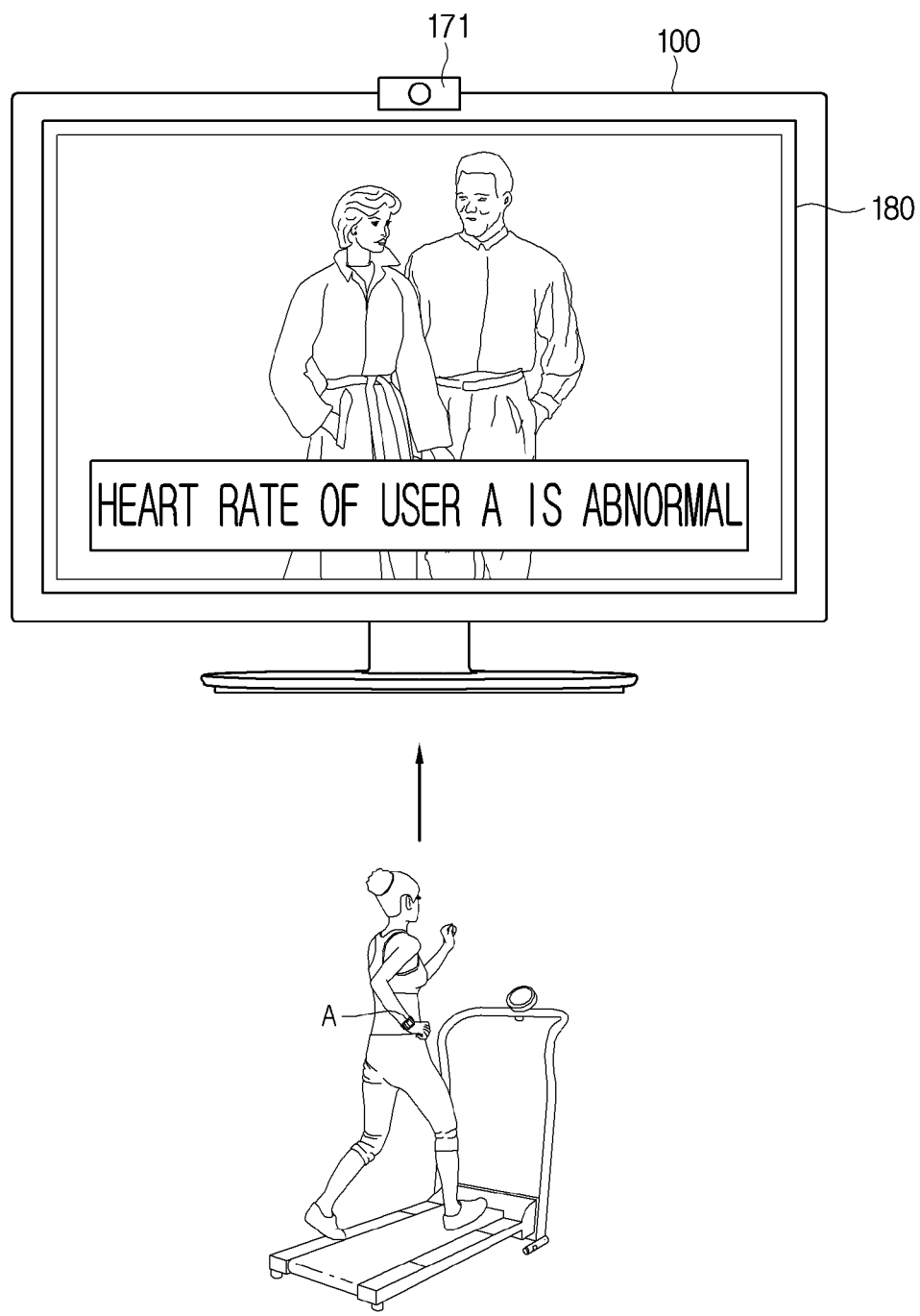
FIG. 24 is a view illustrating a user's abnormal state while a user wearing a wearable device exercises according to an embodiment of the present invention.

FIG. 24 is a view illustrating a user's abnormal state while a user wearing a wearable device exercises according to an embodiment of the present invention.

FIG. 24 is described under the assumption that a user A wears a wearable device 300 and exercises.

When exercise information including a user's heart rate is received from the wearable device 300 and the user's heart rate is in an abnormal state, the control unit 170 may provide the abnormal state of the heart rate through the display unit 180. When the user's heart rate is out of a reference heart rate range, the control unit 170 may display an abnormal state of a heart rate through a pop-up window disposed at one side of a playback screen of media content.

Thus, a user may easily check an abnormal state of a heart rate during exercising and accordingly, may perform an action, for example, stopping exercise.

Then, FIG. 25 will be described.

Figure 25:
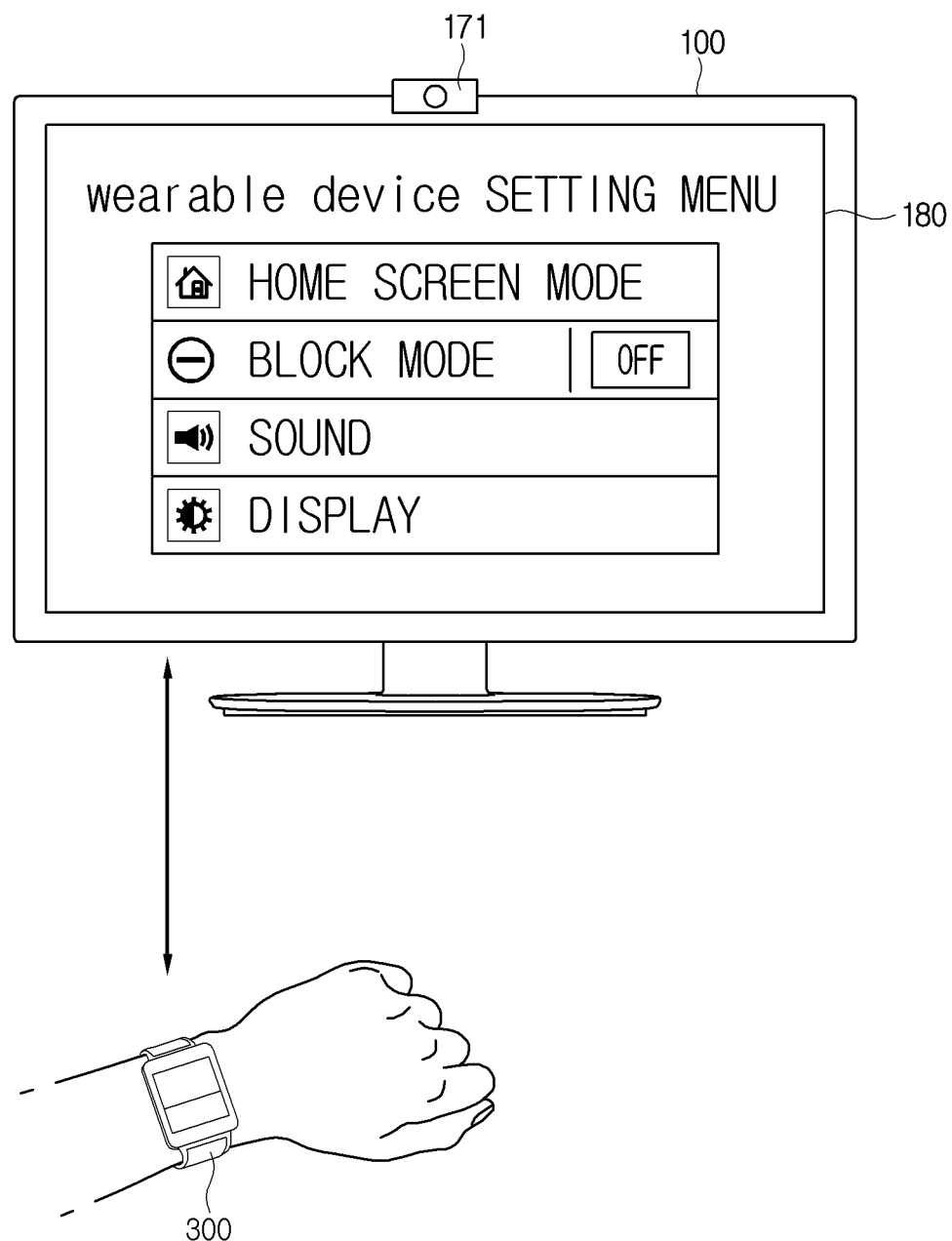
FIG. 25 is a view of controlling a function of a wearable device when a display device and the wearable device interlock with each other according to an embodiment of the present invention.

FIG. 25 is a view of controlling a function of the wearable device 300 when the display device 100 and the wearable device 300 interlock with each other according to an embodiment of the present invention.

The embodiment of FIG. 24 is performed after operation S101.

When the display device 100 recognizes the wearable device 300, the display unit 180 of the display device 100 may display a setting menu of the wearable device 300.

According to an embodiment of the present invention, the setting menu of the wearable device 300 may be displayed on the display device 100 by a selection of a setting button of the wearable device 300.

According to another embodiment of the present invention, the setting menu of the wearable device 300 may be displayed by a selection input of a setting menu button displayed on the display device 100.

When the display device 100 displays the setting menu of the wearable device 300, it may set a function of the wearable device 100 by recognizing a user's hand gesture. That is, when a hand gesture corresponding to a function of the display device 100, for example, cursor selection and cursor movement, is recognized, the display device 100 may set a function of the wearable device 300 according to a recognized hand gesture.

A user may set a function of the wearable device 100 through the display device 100 having a large screen without watching the wearable device 300 having a small screen.

According to an embodiment of the present invention, the above method may be implemented on a program recorded medium with processor readable code. Examples of the processor readable medium may include ROM, RAM, CD-ROM, magnetic tape, floppy disk, and optical data storage devices and also may be implemented in a form of a carrier wave (for example, transmission through internet).

In relation to the above-described display device, the configurations and methods of the above-described embodiments are applied without limitations and in order to provide various modifications, some or all of embodiments may be selectively combined and configured.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An operating method of a display device, the method comprising:
   pairing a wearable device with the display device;
   providing a user interface screen of the display device paired with the wearable device differently based on a wearing state of the wearable device representing whether a user wears the paired wearable device;
   receiving user's exercise information including a user's exercise amount from the wearable device if it is confirmed that the user wears the wearable device; and
   changing a size of a screen displaying the user's exercise information based on a comparison result between the user's exercise amount and a reference exercise amount,
   wherein the providing of the user interface screen of the display device differently comprises displaying the received user's exercise information, and
   wherein the size of the screen displaying the user's exercise information when the user's exercise amount is greater than a reference exercise amount is smaller than the size of the screen displaying the user's exercise information when the user's exercise amount is less than the reference exercise amount.

2. The method according to claim 1, wherein the providing of the user interface screen of the display device differently further comprises displaying a media content being played by the display device in one screen.

3. The method according to claim 2, further comprising, when the user's exercise amount is greater than a reference exercise amount, increasing an audio output of the media content being played,
   wherein the reference exercise amount is one of a predetermined number of user's movements per second or a predetermined user's movement amount per second.

4. The method according to claim 1, wherein the providing of the user interface screen of the display device differently comprises, when it is confirmed that the user does not wear the wearable device, displaying a media content being played by the display device in full screen.

5. The method according to claim 1, wherein the pairing of the wearable device comprises pairing the display device with a plurality of wearable devices, and
   wherein the providing of the user interface screen of the display device differently comprises, when it is confirmed that a plurality of users wear the plurality of wearable devices respectively, displaying a media content being played by the display device and exercise information received from each of the plurality of wearable devices in one screen.

6. The method according to claim 1, further comprising:
   recognizing at least one user's hand gesture; and
   on the basis of whether the wearable device is worn on a hand corresponding to the recognized hand gesture, selectively controlling a function of the display device corresponding to the hand gesture or a function of a wearable device corresponding to the hand gesture.

7. The method according to claim 1, further comprising:
   recognizing at least one user's hand gesture; and
   on the basis of a user's exercise state, selectively controlling a function of a display device corresponding to the recognized hand gesture or a function of a wearable device corresponding to the recognized hand gesture.

8. The method according to claim 1, wherein the wearing state of the wearable device is determined by receiving user's body information detected through a sensor included in the wearable device or determined by extracting an image of a wearable device worn on a user's specific body portion from a user's image obtained through a camera included in the display device.

9. The method according to claim 1, wherein the display device is combined with exercise equipment.

10. A display device comprising:
    a display unit;
    a communication unit configured to perform a communication with a wearable device; and
    a control unit configured to:
      control the display unit and the communication unit,
      pair to a wearable device,
      control the display unit to display a user interface screen of the display device paired with the wearable device differently based on a wearing state of the wearable device representing whether a user wears the paired wearable device,
      receive user's exercise information including a user's exercise amount from the wearable device if it is confirmed that the user wears the wearable device,
      display the received user's exercise information, and
      change a size of a screen displaying the user's exercise information based on a comparison result between the user's exercise amount and a reference exercise amount,
    wherein the control unit displays the size of the screen displaying the user's exercise information when the user's exercise amount is greater than reference exercise amount to be smaller than the size of the screen displaying the user's exercise information when the user's exercise amount is less than the reference exercise amount.

11. The device according to claim 10, wherein the control unit displays a media content being played by the display device in one screen.

12. The device according to claim 10, wherein the control unit, when it is confirmed that the user does not wear the wearable device, controls the display unit thereby displaying a media content being played by the display device in full screen.

13. The device according to claim 10, wherein the control unit pairs with a plurality of wearable devices and, when it is confirmed that a plurality of users wear the plurality of wearable devices respectively, controls the display unit thereby displaying a media content being played by the display device and exercise information received from each of the plurality of wearable devices in one screen.

14. The device according to claim 10, wherein the control unit, when the user's exercise amount is greater than a reference exercise amount, increases an audio output of the media content being played, and
    wherein the reference exercise amount is one of a predetermined number of user's movements per second or a predetermined user's movement amount per second.

15. The device according to claim 10, further comprising a camera recognizing at least one user's hand gesture,
    wherein the control unit performs a control, on the basis of whether the wearable device is worn on a hand corresponding to the hand gesture recognized through the camera, thereby selectively controlling a function of the display device corresponding to the hand gesture or a function of a wearable device corresponding to the hand gesture.

16. The device according to claim 10, further comprising a camera recognizing at least one user's hand gesture,
wherein the control unit performs a control, on the basis of a user's exercise state, thereby selectively controlling a function of a display device corresponding to the hand gesture recognized through the camera or a function of a wearable device corresponding to the hand gesture recognized through the camera.

\* \* \* \* \*